United States Patent
Nakamura et al.

(10) Patent No.: US 6,216,513 B1
(45) Date of Patent: Apr. 17, 2001

(54) APPARATUS FOR MANUFACTURING A RECTANGULAR-WIRE COIL

(75) Inventors: Masayuki Nakamura, Toyota; Yasutomo Kawabata, Aichi-gun; Masahiro Nishioka; Yasuhiko Ishimaru, both of Toyota; Tetsuya Miura, Aichi-ken; Katsuhisa Endo, Tajimi, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/238,028

(22) Filed: Jan. 27, 1999

(30) Foreign Application Priority Data

| Feb. 12, 1998 | (JP) | 10-029609 |
| Jun. 30, 1998 | (JP) | 10-184947 |
| Sep. 2, 1998 | (JP) | 10-248652 |

(51) Int. Cl.$^7$ .................................................. H01F 41/00
(52) U.S. Cl. .................................. 72/148; 29/605; 72/224
(58) Field of Search .......................... 72/224, 225, 371, 72/146, 148; 29/605

(56) References Cited

U.S. PATENT DOCUMENTS

| 2,655,717 | * | 10/1953 | Dunn | 72/146 X |
| 3,606,183 | | 9/1971 | Turk et al. | |
| 3,844,150 | * | 10/1974 | Mees et al. | 72/206 |
| 4,204,417 | * | 5/1980 | McVoy, Jr. | 72/224 X |
| 4,448,054 | * | 5/1984 | Wayne | 72/146 |
| 5,174,013 | * | 12/1992 | Hiroshima et al. | 72/225 X |

FOREIGN PATENT DOCUMENTS

| 16 13 565 | 9/1970 | (DE) . |
| 36 34 668 A1 | 4/1988 | (DE) . |
| 4-313440 | 11/1992 | (JP) . |
| 7-183152 | 7/1995 | (JP) . |

* cited by examiner

Primary Examiner—Carl E. Hall
(74) Attorney, Agent, or Firm—Oliff & Berridge, PLC

(57) ABSTRACT

A circular wire with a circular cross section is wound on a coil reel. When a winding-form motor rotates a winding form, the circular wire is pulled and drawn from the coil reel. Rectangular forming rollers press the circular wire, so that a rectangular wire with a rectangular cross section is formed. The rectangular wire is directly wound on the winding form to be formed into a rectangular-wire coil. Because forming rectangular wire and winding on the winding form are carried out in a sequence of contiguous processes, a separate process for removing torsion set of the rectangular wire is unnecessary. The rectangular-wire coil can be formed from inexpensive circular material wire by a simple and low-cost apparatus. It is also possible and preferable to make dimensions and a shape of the rectangular wire variable by controlling clearance widths between the forming rollers and tension acting on the rectangular wire that has passed through the rollers.

9 Claims, 18 Drawing Sheets

Fig. 8A  Fig. 8B

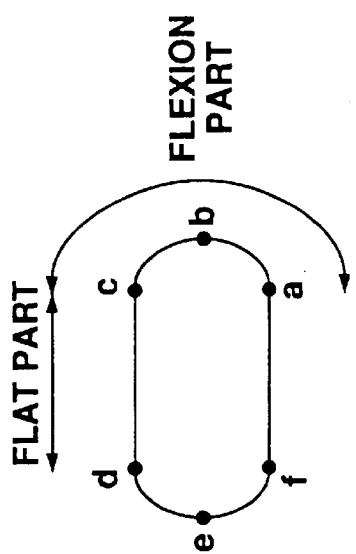
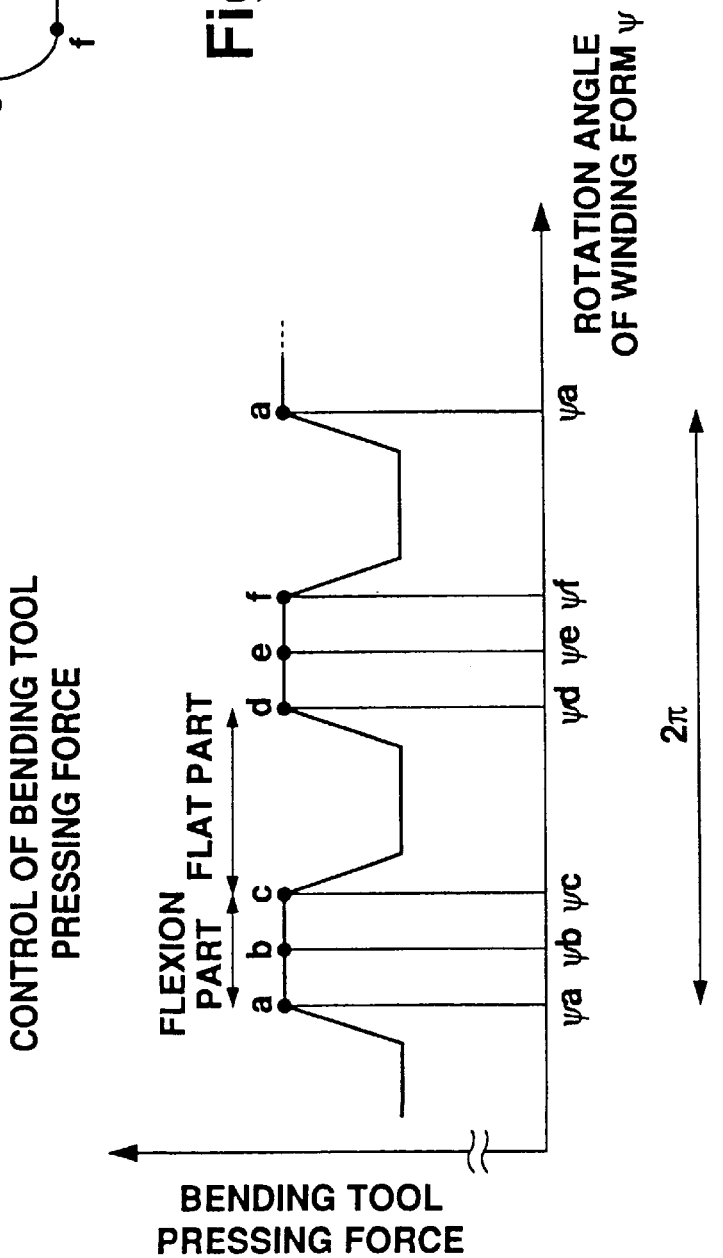
Fig. 12B
Fig. 12A

THE RANGE OF MANUFACTURABLE DIMENTIONS OF RECTANGULAR WIRE

BEFORE DEFORMATION

AFTER DEFORMATION

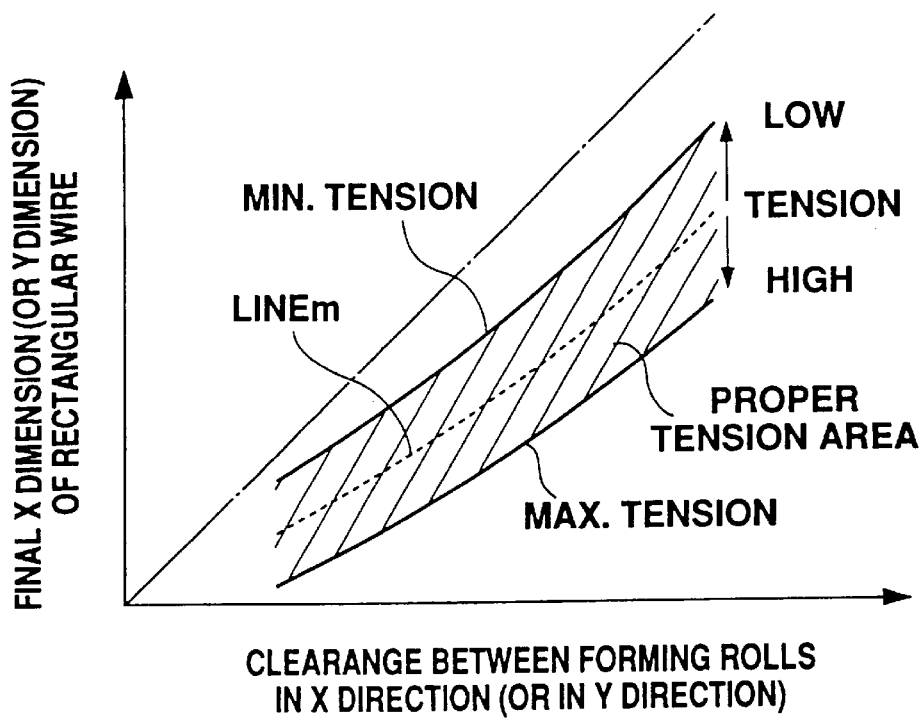
Fig. 17
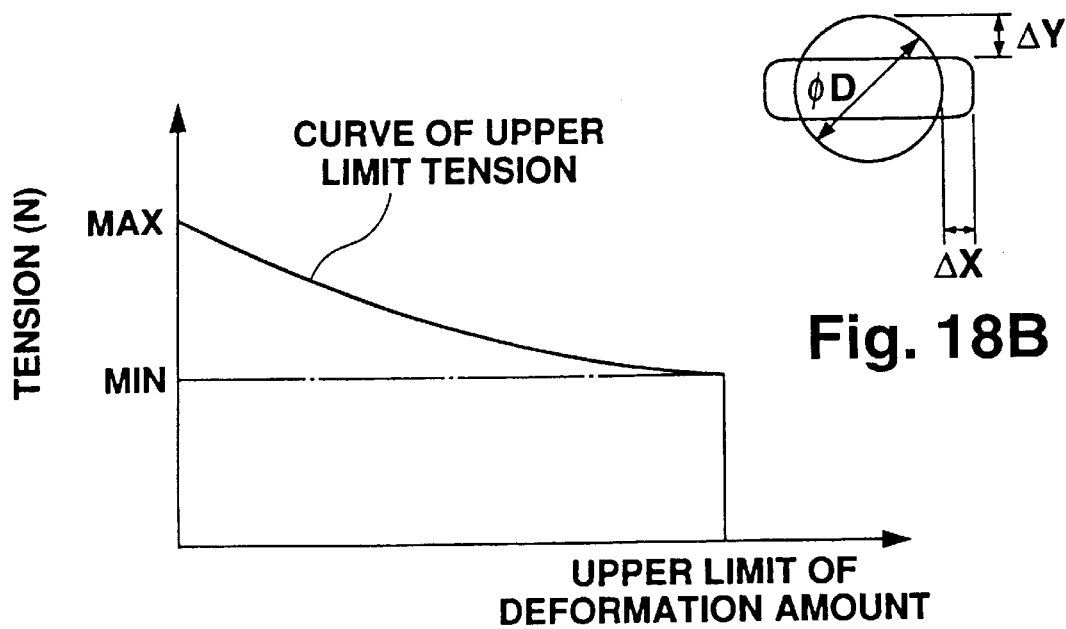
Fig. 18B
Fig. 18A

APPARATUS FOR MANUFACTURING A RECTANGULAR-WIRE COIL

BACKGROUND OF THE INVENTION

1. Field of the invention

The present invention generally relates to an apparatus and process for manufacturing a rectangular-wire coil, and more particularly to an apparatus and simple process for manufacturing a rectangular-wire coil simply at a low cost.

2. Description of the Related Art

Development of electric and hybrid cars has been emphasized as one way to address the need to reduce particle and noise pollution. Development of high-performance motor to be mounted on such a car mentioned above has also proceeded. As coils for such motors, those using circular cross-section enameled wire and those using rectangular enameled wire are both well known.

The circular cross-section enameled wire provides an advantage of that a raw material of wire is low-cost on one hand but has a disadvantage of that the fill factor of a motor is limited, the fill factor of a motor being the ratio of "a sum total of cross-sectional areas of all the coil wire in a slot" to "a cross-sectional area of a slot in a motor body". Motor performance should increase as is increased motor fill factor.

Rectangular enameled wire is enameled wire which has a rectangular cross sectional shape. Using the rectangular enameled wire reduces the clearance between enameled wire in a slot of a motor, so that it becomes possible to increase fill factor of a motor and improve motor performance. From a practical point of view, fill factor of the rectangular enameled wire is generally 70–80%, in contrast to that of the circular cross-section enameled wire which is 30–50%.

For example, an apparatus for manufacturing a coil, shown in Japanese Patent Laid-Open Publication No. Hei 7-183152, is comprised of a bobbin on which rectangular wire is wound, a reduction roll to correct torsion set of the rectangular wire, and a winding form to take up the corrected rectangular wire, wherein a coil is formed by winding the rectangular wire on the winding form.

By using a rectangular-wire coil as mentioned above, it becomes possible to improve the fill factor of a motor. However, this presents a problem that the cost of a motor becomes high since the cost of rectangular enameled wire that is a raw material of the rectangular-wire coil is high. The high cost of such wire mainly derives from factors such as its manufacturing process being more complicated than that of circular cross-section enameled wire, uniform coating of resin around wire shaped rectangular in cross section is difficult, or the like. The cost of rectangular enameled wire is now actually two or more times that of circular cross-section enameled wire.

Attempts have been made to prepare a bobbin wound by the rectangular wire and form a coil using the rectangular wire pulled out of the bobbin as shown in above-mentioned Japanese Patent Laid-Open Publication No. Hei 7-183152. Torsion set, however, appears when the rectangular wire is wound on the bobbin. The remaining torsion set causes the shape of the completed coil to be less accurate, sets torsion on the rectangular wire, and creates clearance between the rectangular wire. It is therefore necessary to provide a reduction roll for removing the torsion set in the art described above. Such construction complicates the manufacturing process and apparatus and causes to motor cost to increase.

SUMMARY OF THE INVENTION

It is an object of the present invention to provide a simple and low-cost method and apparatus for manufacturing a rectangular-wire coil which does not require correcting torsion set of the rectangular wire.

It is a further object of the invention to provide an apparatus capable of manufacturing coils of one or more types, differing in cross-sectional shapes of the rectangular wire to be wound, through a single apparatus and thereby further improve productivity.

(1) An apparatus for manufacturing a rectangular-wire coil of this invention comprises feeding means for supplying material wire, rectangular forming means whereby the material wire provided through said feeding means is deformed to form rectangular wire shaped rectangular in cross section, and coil forming means whereby said rectangular wire is wound on a winding form to form a rectangular-wire coil; and wherein forming rectangular wire and winding on said winding form are performed in a sequence of contiguous processes.

Wire used as a raw material for manufacturing a coil of this invention may be an inexpensive conductor of circular or other cross sectional shape. A process to form rectangular wire from the material wire and a process to take up the rectangular wire on a winding form and form a coil are executed in a sequence of contiguous processes. Since the occurrence of torsion set caused by taking up the rectangular wire to a bobbin is thereby prevented, an apparatus process for removing such torsion set may be excluded. The material wire has torsion set, but this torsion set is spontaneously removed in the process to form the rectangular wire through deforming the material wire. Thus, this invention allows a rectangular-wire coil to be manufactured through a simple and low-cost apparatus using a low-cost wire as raw material. Consequently, it becomes possible to provide a high-performance motor at a low cost.

In addition, it is preferable to cover material wire beforehand with an insulation resin (enamel and so on) of which elasticity is high. As a result of this, uniform insulating coating is spontaneously deposited on a circumference of the finished rectangular wire when it is formed from material wire. In this regard, this invention allows rectangular-wire coil to be manufactured simply and at low cost.

(2) It may be preferable for said rectangular forming means to include rectangular forming rollers for deforming material wire plastically and for said coil forming means to include a winding-form motor for rotating said winding form. By rotating said winding form using the turning force generated by said winding-form motor, the rectangular wire is pulled so as to provide rectangular wire with the tension required to remove the material wire from the rectangular forming rollers as well and to wind the rectangular wire on said winding form. According to this aspect, turning force of the winding-form motor works to form the rectangular wire and to form a coil. An apparatus for manufacturing a coil may thereby be simplified.

(3) An apparatus for manufacturing a rectangular-wire coil in an aspect of this invention may comprise winding-form motor control means for controlling said winding-form motor in order to vary a rotational speed of the motor according to a rotation angle of said winding form. When the rectangular wire, for example, is wound on a flexion portion of the winding form, reliable forming of the flexion portion is necessary. Therefore, the winding-form motor preferably reduces speed at that point. When the rectangular wire is wound on a flat portion of the winding form, the coil is reliably formed, compared with the time of winding to the flexion portion, even though the winding-form motor increases speed. According to this aspect, the control corresponding to each rotation angle thus allows rotational speed of motor to increase while maintaining reliability of coil formation, and therefore enables coil manufacturing speed to increase.

(4) In another aspect of the present invention, said feeding means includes a rotatable material wire reel on which said material wire is wound, and back tension producing means to prevent an occurrence of sag by imparting back tension to a part of the material wire between said material wire reel and said rectangular forming rollers. In this aspect, said back tension producing means imparts back tension, based on a difference between a rotational speed of said winding form and that of said material wire reel, to the material wire and changes said back tension according to a rotational speed of said winding-form motor and in conjunction with said winding-form motor control means.

When material wire is pressed through the rectangular forming rollers, the raw wire stretches and its cross-sectional area decreases. A rotational speed of the winding form is therefore different from that of the material wire reel. In this aspect, the occurrence of undesirable sag can be reliably prevented because back tension provided to the material wire corresponds to the difference of rotational speeds. Especially, control cooperating with an apparatus for controlling the winding-form motor changes back tension in response to change in speed of the winding-form motor in this aspect. Improper sag of the material wire may therefore be correctly and reliably prevented.

(5) In further aspect of the present invention, said coil forming means includes a press roller for pressing the rectangular wire to closely contact with said winding form, and means for controlling roller pressing force which changes roller pressing force generated by said press roller according to a rotation angle of the winding motor, and wherein said means for controlling roller pressing force decreases said roller pressing force when said press roller is located on the flat portion of said winding form and increases said roller pressing force when said press roller is located on the flexion portion of said winding form.

The rectangular wire tends to create a clearance between the winding form and itself through its own elasticity when it is wound on the winding form and also similarly creates clearance between lower layer rectangular wire and itself when it is wound in multiple layers. This phenomenon is known as "springback". In this aspect of the present invention, springback is prevented by the attached press roller. The roller pressing force is preferably increased to neatly arrange R shape of the rectangular wire, especially when the press roller is located on the flexion portion of the winding form. In this aspect, control of the roller pressing force according to a rotation angle allows the pressing force to operate in an efficient manner, so that the rectangular wire is reliably wound on the winding form. It is thereby possible to improve the quality of the resulting coil.

(6) According to yet another aspect of the present invention, said coil forming means includes a bending tool for pressing a portion of said rectangular wire which is on the brink of being wound on said winding form, into contact with another portion that has already been wound in order that they come in contact with one another. Also included are control means of bending tool pressing force which changes bending tool pressing force through said bending tool according to a rotation angle of said winding form, wherein said control means of bending tool pressing force decreases said bending tool pressing force when said bending tool is located on the flat portion of said winding form and increases said bending tool pressing force when said bending tool is located on the flexion portion of said winding form.

According to this aspect, improvement in coil quality is also enhanced, as was the case in (5) above. Attaching said bending tool prevents rectangular wire from separation from an adjoining part of the rectangular wire when being wound. When the bending tool is located on the flexion portion, the rectangular wire can preferably be arranged by increasing the bending tool pressing force. In this aspect, control of the bending tool pressing force according to rotation angle allows the pressing force to operate in an efficient manner, so that rectangular wire is reliably wound on the winding form.

(7) A method of manufacturing a rectangular-wire coil of this invention may comprise a feeding process for supplying material wire, rectangular forming process whereby the material wire provided through said feeding means is deformed to form wire with a rectangular cross section, and coil forming process whereby said rectangular wire is wound on a winding form to form a rectangular-wire coil; forming of rectangular wire and winding on said winding form are performed in a sequence of contiguous processes.

(8) An apparatus for manufacturing a rectangular-wire coil preferably embodying an aspect of this invention may comprise rectangular forming control means for controlling said rectangular forming means according to target forming dimensions of the rectangular wire, wherein coils of a plurality of differing cross-sectional shapes manufactured. It is preferable that said rectangular forming control means adjusts cross-sectional shapes of said rectangular wire by controlling tension of said rectangular wire.

In this aspect, the cross-sectional shape of the rectangular wire may be variable by controlling the rectangular forming means. A plurality of rectangular wires differing in cross-sectional shape may be manufactured from a single type of material wire, while a plurality of types of rectangular-wire coils may be manufactured by a single apparatus. It thereby becomes unnecessary to prepare separate facilities for different types of coils, and the cost of facilities may be reduced. As a single type of material wire, in addition, is used to produce one or more types of coils, the economies of mass production results in a reduction of materials cost. Thus, this invention may contribute more improvement of productivity and cost reduction for manufacturing a rectangular-wire coil.

(9) In an apparatus for manufacturing a rectangular-wire coil preferably embodying an aspect of this invention, an insulation adhering means for depositing an insulating material on said rectangular wire is equipped to said rectangular forming means or provided between said rectangular forming means and said coil forming means.

According to this aspect, an insulating material may bridge clearance between the rectangular wire of a coil by attaching the insulating material on the rectangular wire before coil forming. Therefore, thermal conductivity may be improved through simple construction. In addition, the improvement of thermal conductivity increases the performance of a motor provided with a rectangular-wire coil.

BRIEF DESCRIPTION OF THE DRAWINGS

FIG. 12 shows control of a bending tool pressing force generator;

FIG. 17 shows a map used for the process of FIG. 15;

FIG. 18 shows a relationship between deformation amount of rectangular wire and an upper limit value of tension.

DESCRIPTION OF PREFERRED EMBODIMENTS

EMBODIMENT 1

The following describes a first embodiment of the present invention with reference to the attached drawings.

Figure 1:
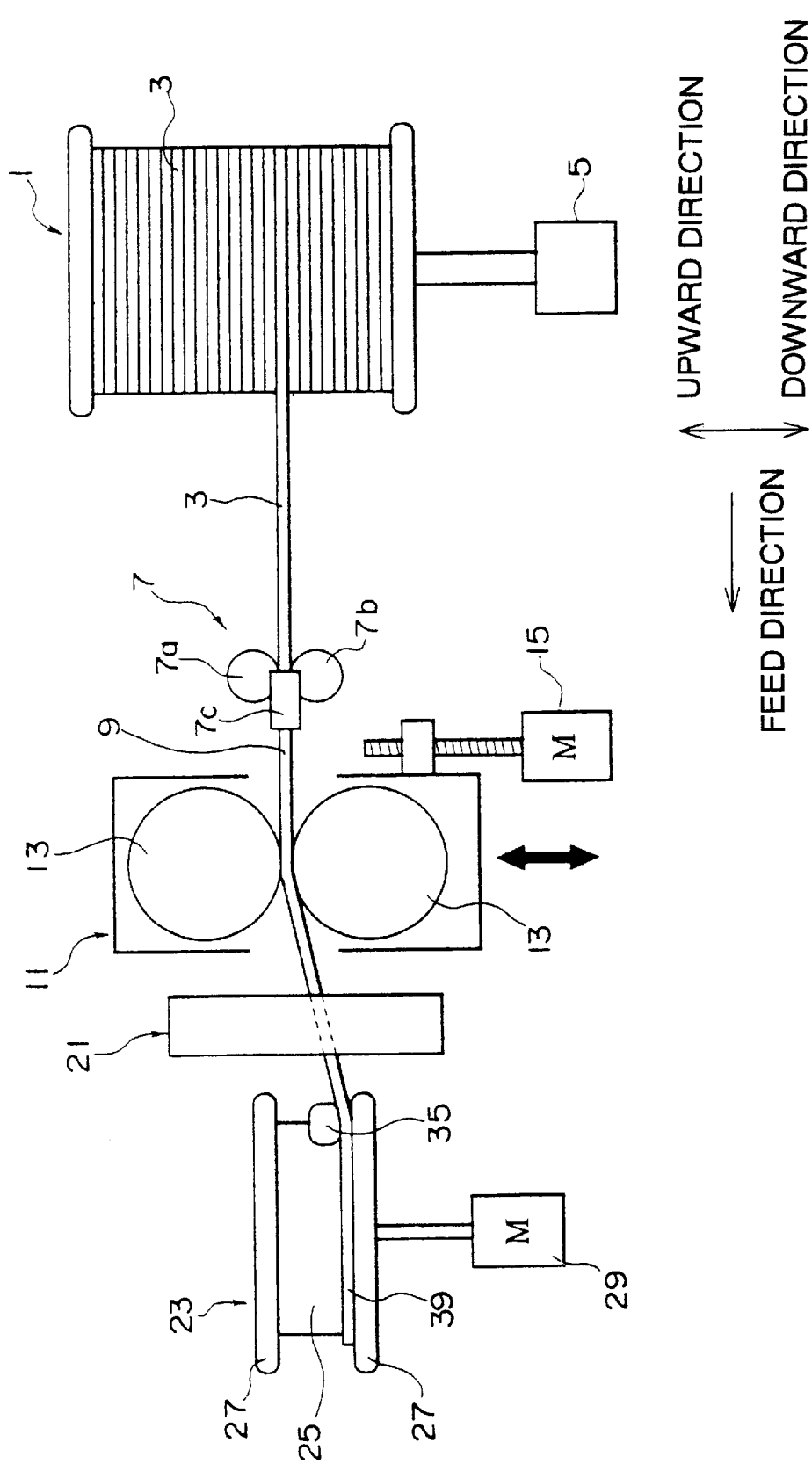
FIG. 1 is a front view of an apparatus for manufacturing a rectangular-wire coil according to the present invention.
Figure 2:
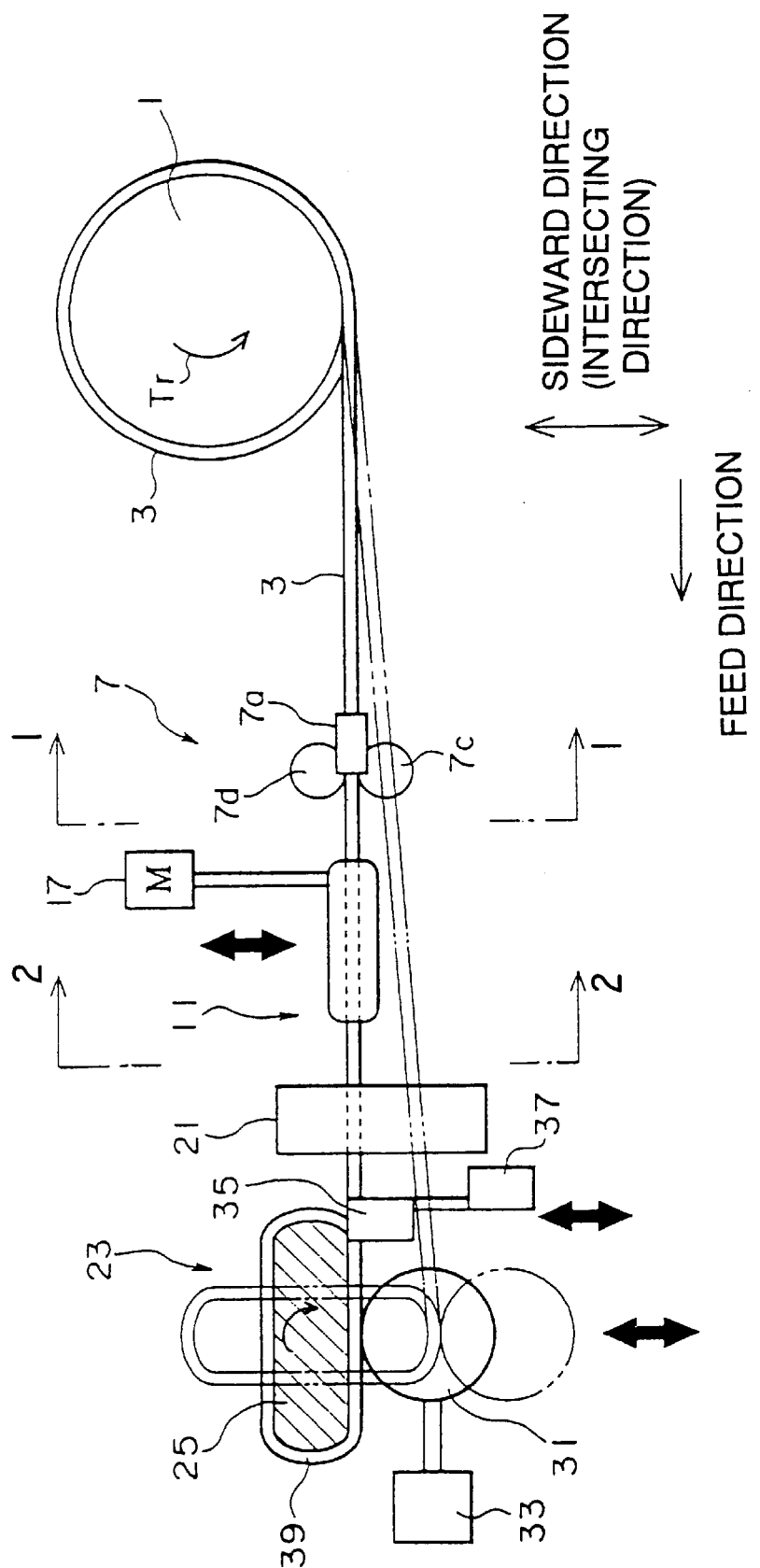
FIG. 2 is a plan view of the apparatus of FIG. 1.
Figure 3:
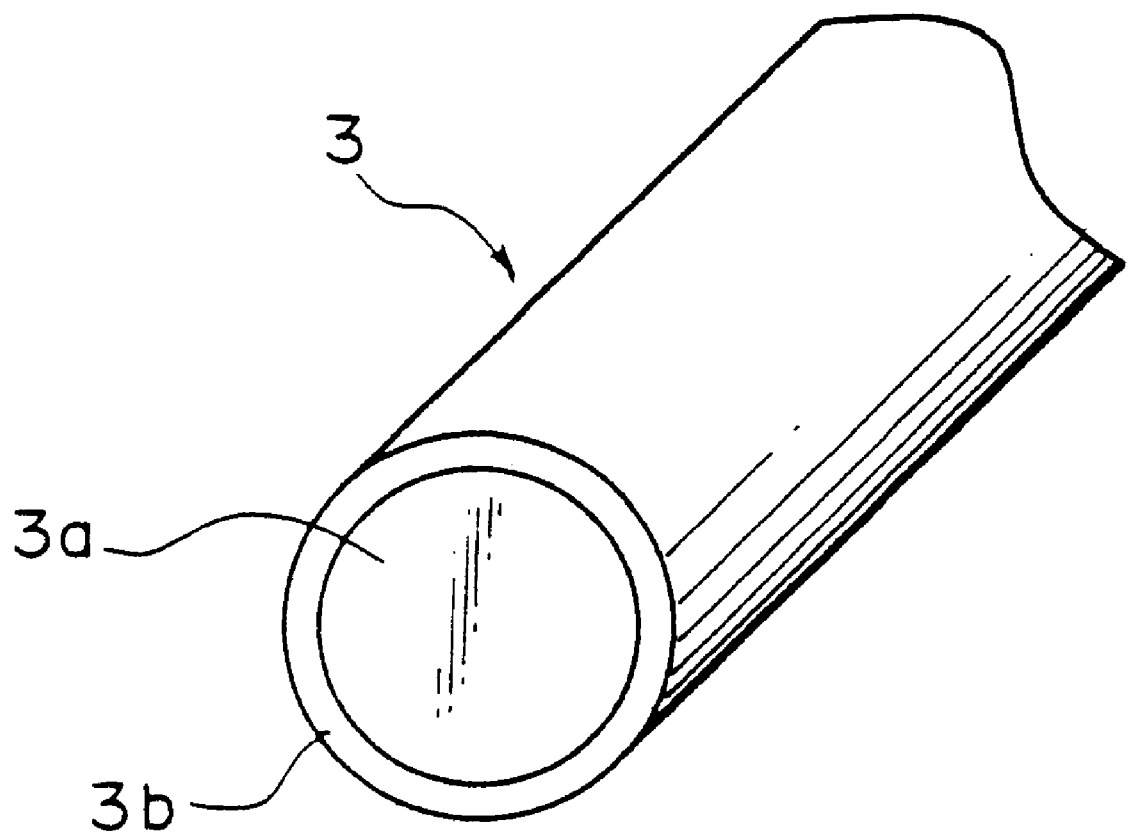
FIG. 3 is a drawing showing material wire with a circular cross section.

FIG. 1 is a front elevation and FIG. 2 is a plan view of an apparatus for manufacturing rectangular-wire coil according to the first embodiment of the present invention. Circular material wire 3 is wound on a bobbin of a coil reel 1. The circular material wire 3 has a circular cross section as illustrated in FIG. 3 and has a conductor part 3a covered with a resin coating 3b, such as enamel. The thickness of resin coating 3b is on the order of a few tens of micrometers. The coil reel 1 is rotatable and is equipped with a rotational resistance generator 5, which produces rotational resistance force (torque, Tr) of the coil reel 1 when the circular material wire 3 is pulled out. The resistance force generates back tension to the circular material wire 3. This prevents slack from occurring in the circular material wire 3.

Figure 4:
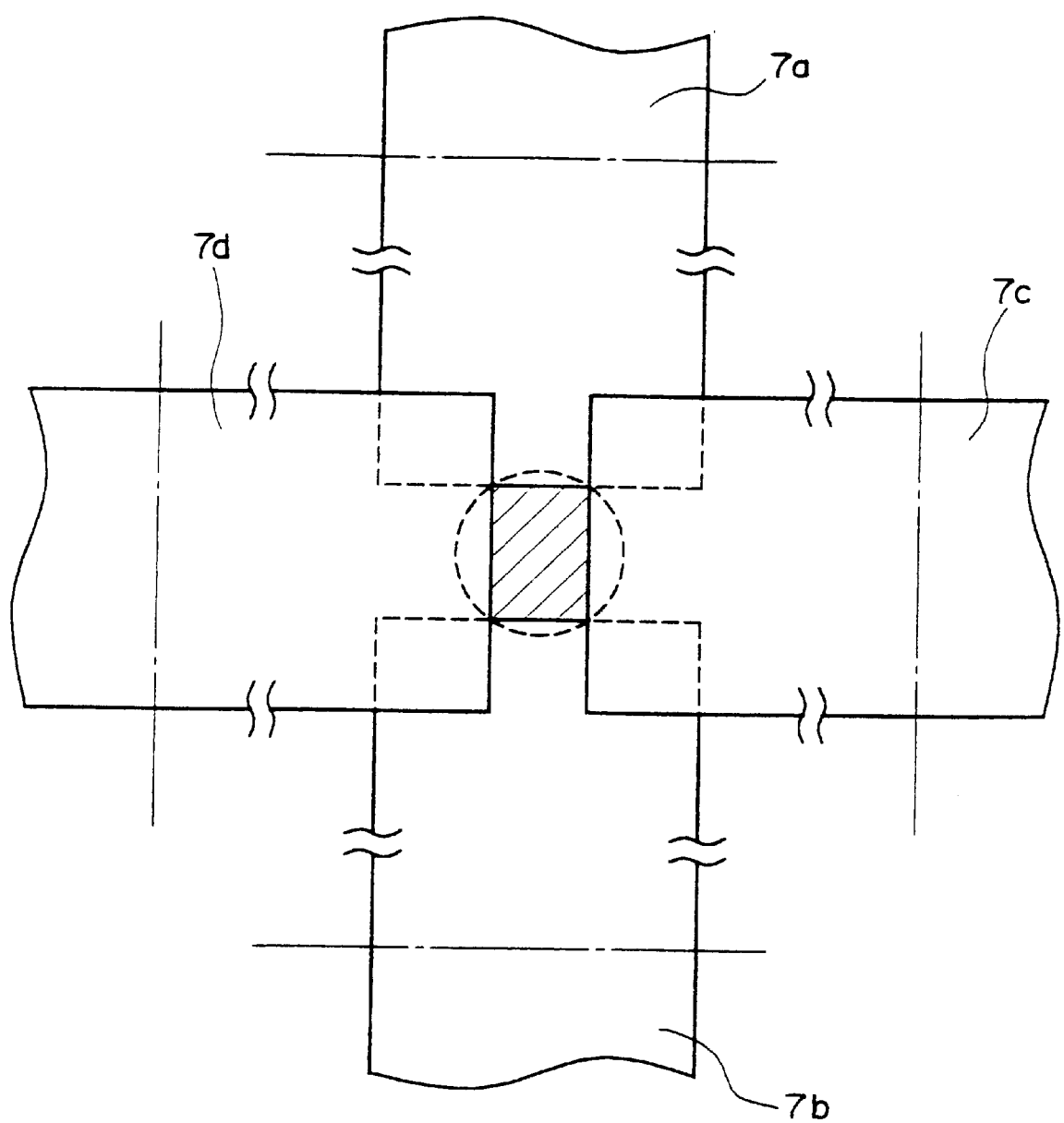
FIG. 4 is a sectional view of FIG. 2 taken along the line A—A, showing rectangular forming rollers.

The circular material wire 3 pulled from the coil reel 1 passes through rectangular forming rollers 7. FIG. 4 is a sectional view of FIG. 2 taken along the line A—A. The rectangular forming rollers 7, as illustrated in FIG. 4, include rollers 7a and 7b installed on a forward stage for pressing the circular material wire 3 from up and down, and rollers 7c and 7d installed on a subsequent stage for applying lateral pressure. Each of these rollers is rotatable. Consequently, the circular material wire 3 is plastically deformed as it passes through the rectangular forming rollers 7. Rectangular wire 9 is then formed. The plastic deformation allows torsion set on the circular material wire 3 to be removed. That is, the rectangular forming rollers 7 provide two capabilities; forming rectangular wire, and removing the torsion set.

Figure 5:
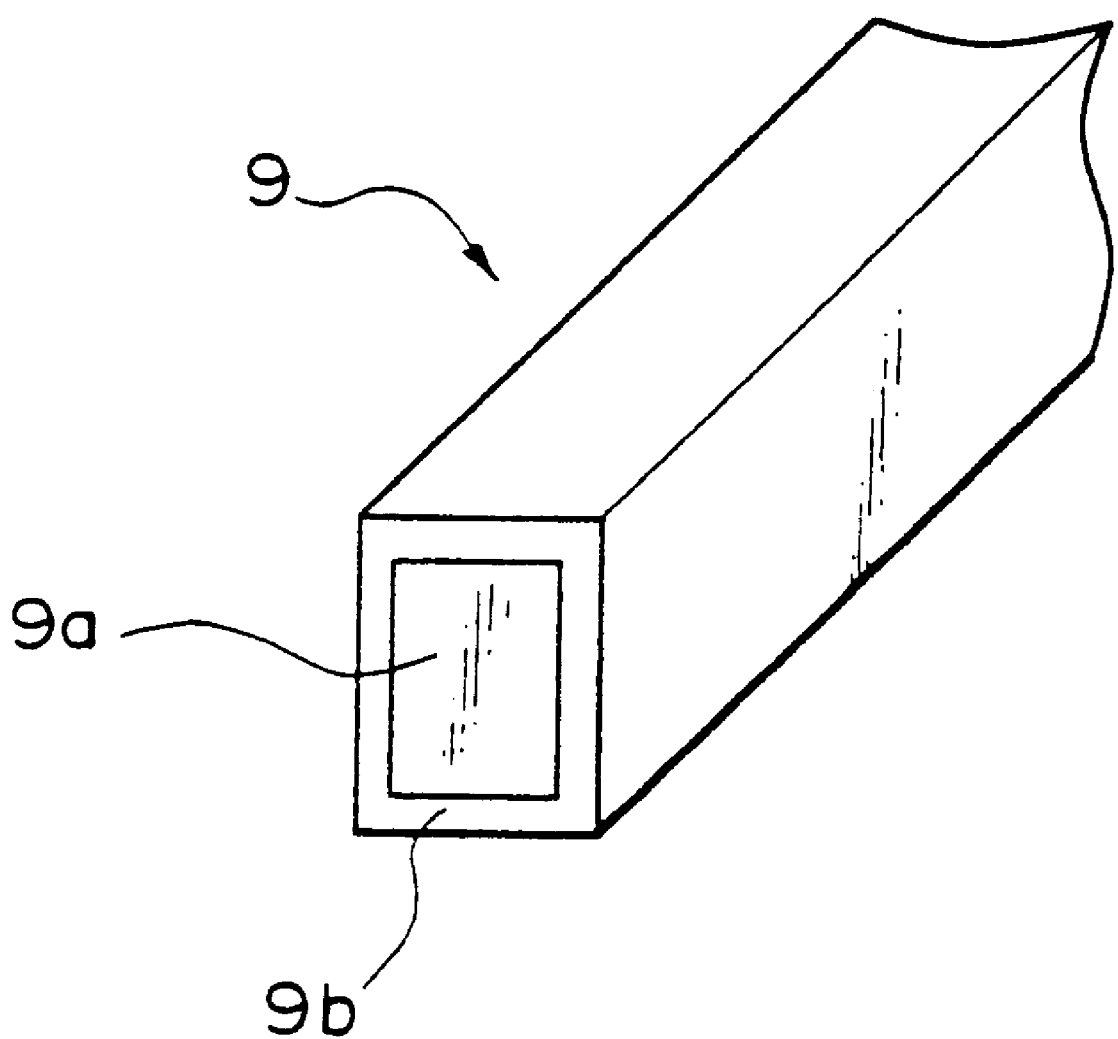
FIG. 5 shows rectangular wire formed from circular material wire.

FIG. 5 shows formed rectangular wire 9 that a rectangular cross section, and the conductor part 9a of which is covered with a resin coating 9b. The resin coating 9b covers the rectangular wire 9 with uniform thickness because the circular material wire 3 is covered with highly elastic resin coating 3b. As can be seen from FIG. 4, a cross-sectional area of a raw material of wire decreases in the process of forming the rectangular wire 9 from the circular material wire 3. The raw material wire accordingly lengthens when forming the rectangular wire 9.

Figure 6:
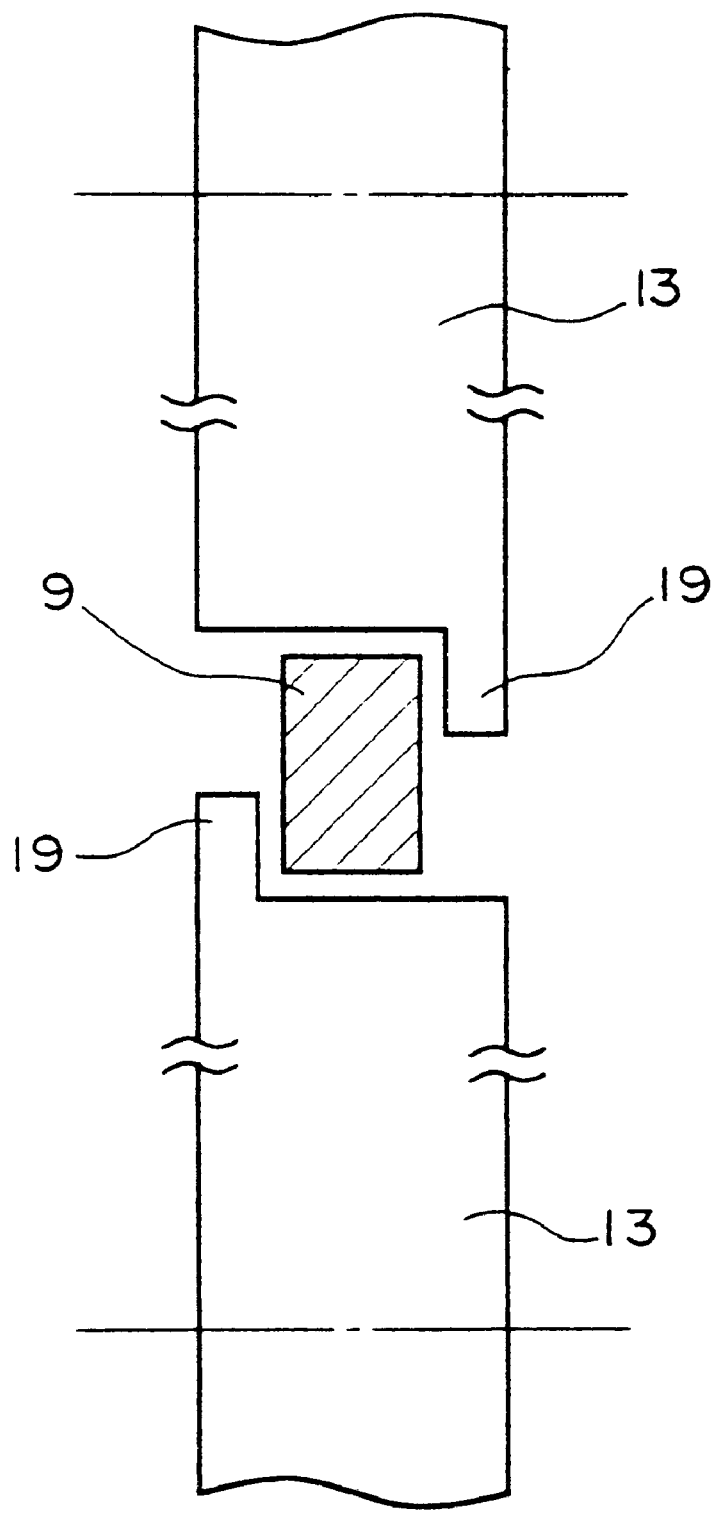
FIG. 6 is a sectional view of FIG. 2 taken along the line B—B, showing a winding position adjustment unit.

A winding position adjustment unit 11 with the capability of leading the rectangular wire 9 in desired direction is equipped on the subsequent stage of the rectangular forming rollers 7. A pair of winding position adjusting rollers 13 are attached to the winding position adjustment unit 11 and the rectangular wire 9 is inserted between upper and lower rollers of the pair. FIG. 6 is a sectional view of FIG. 2 taken along the line B—B. Each of the winding position adjusting rollers 13 has a guide fringe 19 shaped with a flange on its rim, as illustrated in FIG. 6. The rectangular wire 9 is inserted laterally between the guide fringes 19 to prevent it from slipping off the rollers 13.

As shown in FIG. 1 and FIG. 2, a first winding position adjusting motor 15 to move the winding position adjustment unit 11 vertically, and a second winding position adjusting motor 17 to move that laterally are included. Both motors shift the winding position adjustment unit 11 according to a rotation angle of a winding form 25 on a subsequent stage. As a result, the rectangular wire 9 is led in the proper direction, i.e., the direction pointing where the leading edge of the rectangular wire 9 can be tangent to the winding form 25 at each position while preventing improper torsion. The leading edge of the rectangular wire 9 refers to a section about to be wound on the winding form 25 (the part to be formed as a part of a coil). The rectangular wire 9 is taken up in a stacking-like pattern as shown in the figure by shifting the winding position adjustment unit 11 vertically and leading the wire in the desired direction decided by the rotation of the winding form 25 through shifting the winding position adjustment unit 11 laterally. The rectangular forming rollers 7 preferably shift in conjunction with the winding position adjustment unit 11, which is not illustrated.

Figure 7:
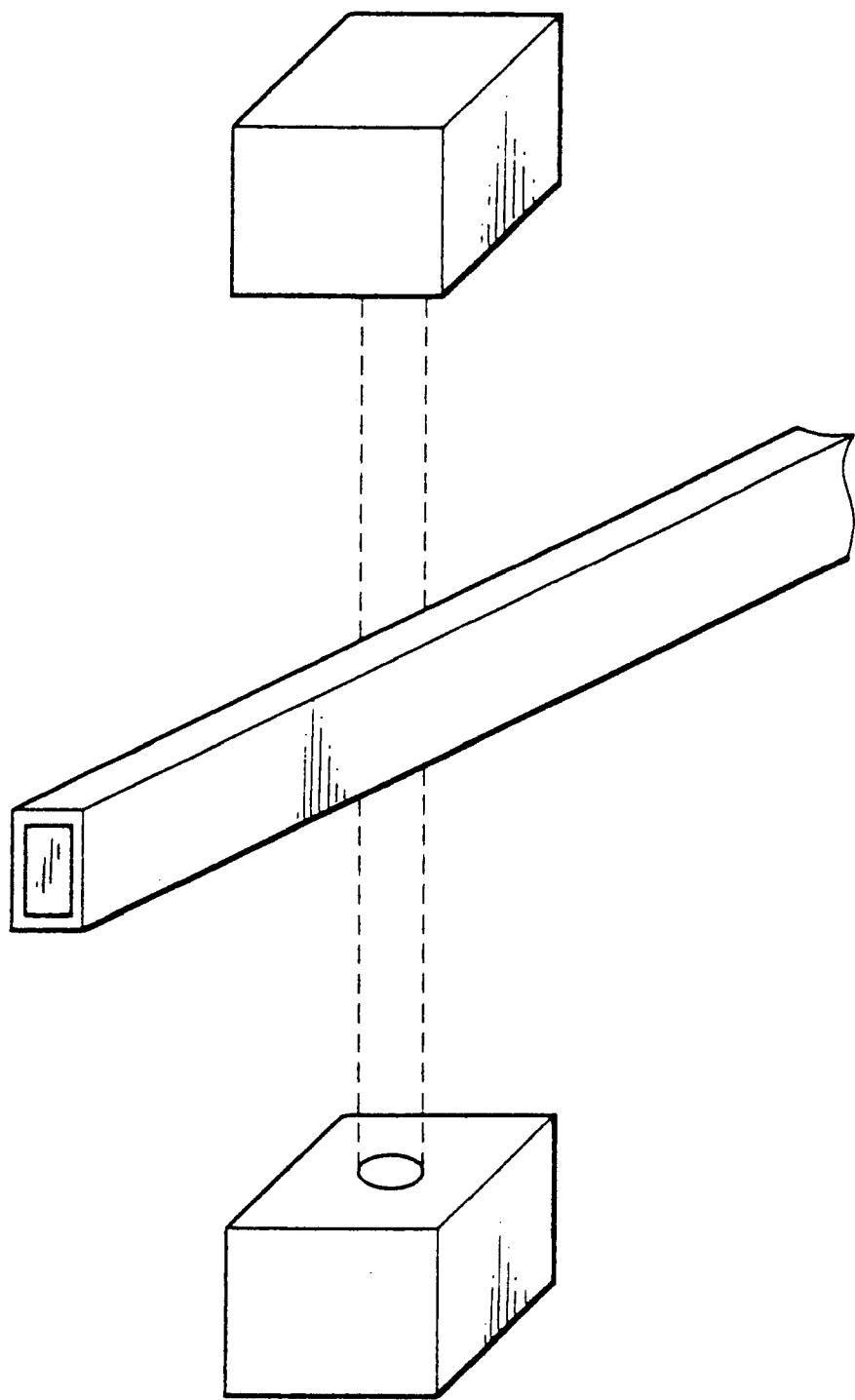
FIG. 7 illustrates a measuring instrument for quality verification.

A measuring instrument for quality verification 21, which detects flaws in the rectangular wire 9, and more particularly checks that the resin coating 9b is not damaged or imperfect, is mounted on a subsequent stage of the winding position adjustment unit 11. The measuring instrument 21 may be either a contact or non-contact type. An impulse waveform measuring instrument is adopted in this embodiment as illustrated in FIG. 7 to detect flaws in the rectangular wire 9 through variations in output waveforms.

A coil forming device 23 is mounted on a subsequent stage of the measuring instrument for quality verification 21. The rotatable winding form (a major form) 25, with a rounded, rectangular cross section as illustrated in FIG. 2, is attached as a coil winding jig on the coil forming device 23. The parts corresponding to longer sides of a rectangle are flat and the parts corresponding to shorter sides are rounded (cylindrical-shaped surface) and are referred to as flexion portions. The winding form 25 has winding form flanges 27 on both its top and bottom, as illustrated in FIG. 1.

A winding-form motor 29 is connected to the winding form 25 to rotate the winding form 25. The rectangular wire 9 is taken up to the winding form 25 when the winding-form motor 29 rotates. As a consequence, a coil 39 is formed. In addition, turning force of the winding-form motor 29 rotates the winding form 25 and thereby pulls the rectangular wire 9. The force pulling the rectangular wire 9 causes the circular material wire 3 to pass through the rectangular forming rollers 7 and be pulled out of the coil reel 1.

Figure 8C:
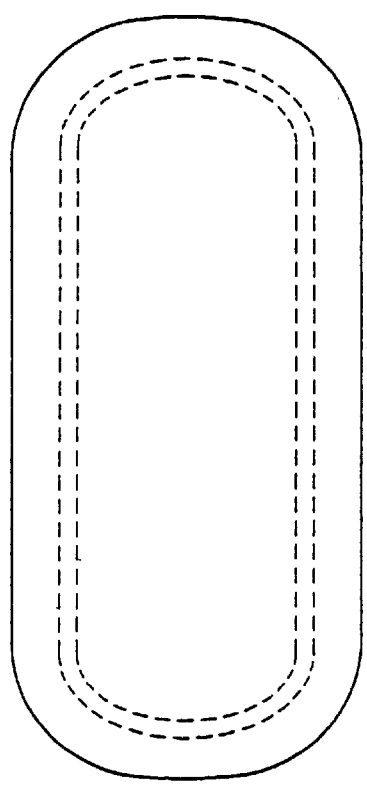
FIG. 8 illustrates the process of winding rectangular wire on a winding form.
Figure 8C:
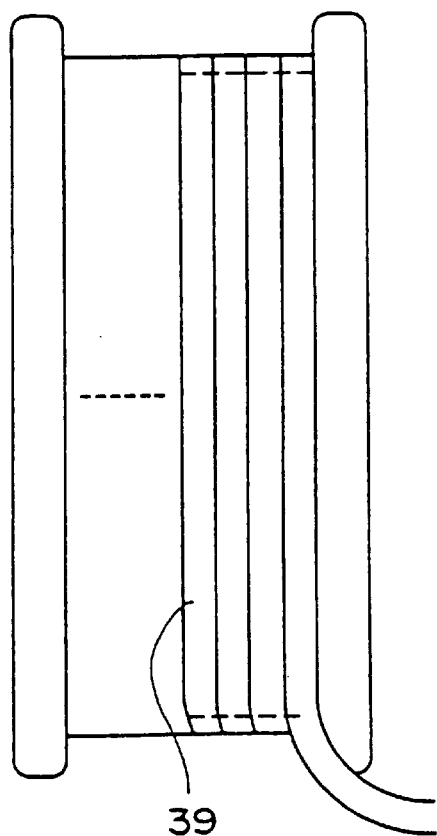
Figure 8C:
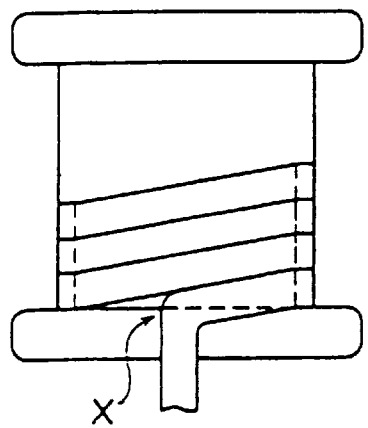

FIG. 8 shows how the rectangular wire 9 is wound on the winding form 9. At the starting position, X is located at the lower center of the flexion portion as illustrated in the figure. The rectangular wire 9 is wound from the bottom of the winding form 25 in such a manner like stacking. When the rectangular wire 9 reaches to the top of the winding form 25, it is wound on the second and the third layers. A rectangular-wire coil 39, for example, one with thirty turns of a rectangular-wire coil, is thus formed.

As illustrated in FIG. 8, the rectangular wire 9 is diagonally wound in the flexion portion and horizontally wound (on a plane orthogonal to the axis of the winding form) in the flat portion. This method of winding has the following advantages. When the rectangular-wire coil 39 of this embodiment is incorporated into a stator of a motor, the flat portions of the coil are housed in slots of the stator and the flexion portions protrude from each end of the stator. At this point, if the rectangular wire 9 is wound on the skew in the flat portions, clearance will be created between an end face of the coil and an interior wall of the slot. As a result, fill factor decreases. As the rectangular wire 9 is wound horizontally in the flat portions, a clearance between the end face of the coil and the interior wall of the slot is prevented. Thus, fill factor increases.

Returning now to FIGS. 1 and 2, a press roller 31 is equipped to the coil forming device 23. The rectangular wire 9 tends to create a clearance between the winding form 25 and itself through its own elasticity when it is wound on the winding form (springback). The press roller 31 prevents springback by pressing the rectangular wire 9 to the winding form 25. A roller pressing force generator 33 produces roller pressing force to press the press roller 31 to the rectangular wire 9 and is capable of varying this roller pressing force. The roller pressing force generator also shifts the press roller 31 according to a rotation angle of the winding form 25, thus maintaining a fixed distance between the press roller 31 and a perimeter of the winding form 25 (corresponding to a width of the rectangular wire 9).

A bending tool 35, which presses the rectangular wire 9 downwards, is mounted to the coil forming device 23. A generator of bending tool pressing force 37 produces bending tool pressing force to press the bending tool 35 to the rectangular wire 9. Pressing the rectangular wire 9 through the bending tool 35 enables a part of the rectangular wire 9 to be brought into intimate contact with the next part of that to be wound lower. The generator of bending tool pressing force 37 is capable of achieving a change in bending tool pressing force and shifts the bending tool 35 according to a rotation angle of the winding form 25. A constant distance between the bending tool 35 and a perimeter of the winding form 25 is maintained and the bending tool 35 is shifted upward as the rectangular wire 9 is wound.

The configuration of the apparatus for manufacturing a rectangular-wire coil of this embodiment has been explained above. The operation of this apparatus will next be explained in the following.

First, the leading edge of the rectangular wire 9 is hung on the winding form 25 and the winding-form motor 29 begins to rotate. While the rectangular wire 9 is taken up to the winding form 25 through rotation (clockwise direction in FIG. 2) of the winding form 25, the portion of the rectangular wire 9 not yet wound is pulled. The pulling force is transmitted to the coil reel 1 via the rectangular wire 9 and the circular material wire 3 preparatory to deformation. This rotates the coil reel 1 in a clockwise direction and pulls the circular material wire 3 out. At this time, the rotational resistance generator 5 provides force of rotational resistance (torque: Tr) to the coil reel 1 (in a counterclockwise direction). The improper slack is, therefore, prevented from occurring to the circular material wire 3.

When the circular material wire 3, being pulled out of the coil reel 1 passes through the rectangular forming rollers 7, the circular material wire 3 is pressed vertically and laterally through rollers so as to form the rectangular wire 9. At this point, the circular material wire 3 is plastically deformed and elongates in its longitudinal direction as its cross-sectional area decreases. In order for the circular material wire 3 to pass through a clearance between rollers while being deformed, the rectangular wire 9 will need to be pulled with great force. Therefore, the winding-form motor 29 generates motor torque of such amplitude that is required to pull the rectangular wire 9.

The rectangular wire 9 is lead to a proper direction by the winding position adjustment unit 11 after passing through the rectangular forming rollers 7. The rectangular wire 9 then passes through a measuring instrument for quality verification 21, where the rectangular wire 9 is checked that it has no flaws. The wire is then taken up to the winding form 25. As a consequence, the rectangular-wire coil 39 is formed in such a manner that the rectangular wire 9 is stacked and wound from the bottom and wrapped in a plurality of layers. The press roller 31 and the bending tool 35 presses the rectangular wire 9 as described above, so that the rectangular wire 9 is wound so as to be in intimate contact with the winding form 25 and with each other.

A coil will be complete when the winding form 25 rotates a predetermined number of times. The completed coil is isolated from a remaining part of the rectangular wire 9 which has not yet been wound, removed from the winding form 25 and sent to an assembly process of a motor. Then the leading edge of the rectangular wire 9 having been torn off is hung on the winding form 25 to start manufacturing the next coin in a like manner.

A coil manufactured according to this embodiment may be preferably used as an interpole winding coil. An interpole winding coil refers to a coil wherein two flat portions of a coil are housed in respective slots adjacent to each other via teeth of a motor stator. As a matter of course, an apparatus of this embodiment may be applied to the manufacture of other types of coils.

Up to this point, a method for manufacturing a coil according to this apparatus has been explained. Each component, such as the winding-form motor 29, may be preferably controlled as explained below.

CONTROL OF WINDING-FORM MOTOR

The rectangular wire 9 is taken up to the winding form 25 through rotation of the winding form 25. Therefore, the winding-form motor 29 must produce torque of sufficient magnitude to pull the rectangular wire 9. The rectangular wire 9 is also pulled through rotation of the winding form 25. This pulling force is transmitted and makes the circular material wire 3 into the rectangular wire 9. Then the winding-form motor 29 also needs to produce torque of sufficient magnitude to pull out the circular material wire 3 from a clearance between rollers of the rectangular forming rollers 7. Thus, the winding-form motor 29 produces the torque required for the processes of coil formation and rectangular formation. This allows the apparatus to be simplified.

Figure 9B:
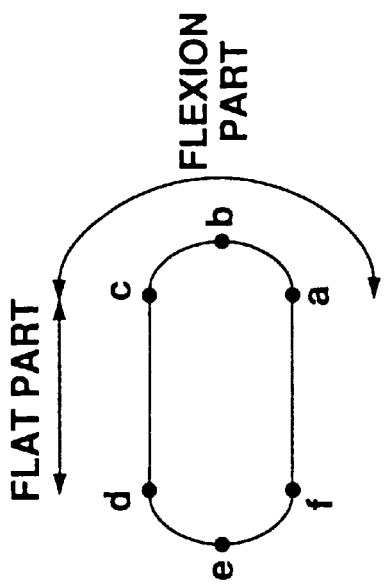
FIG. 9 shows control of a winding-form motor.
Figure 9A:
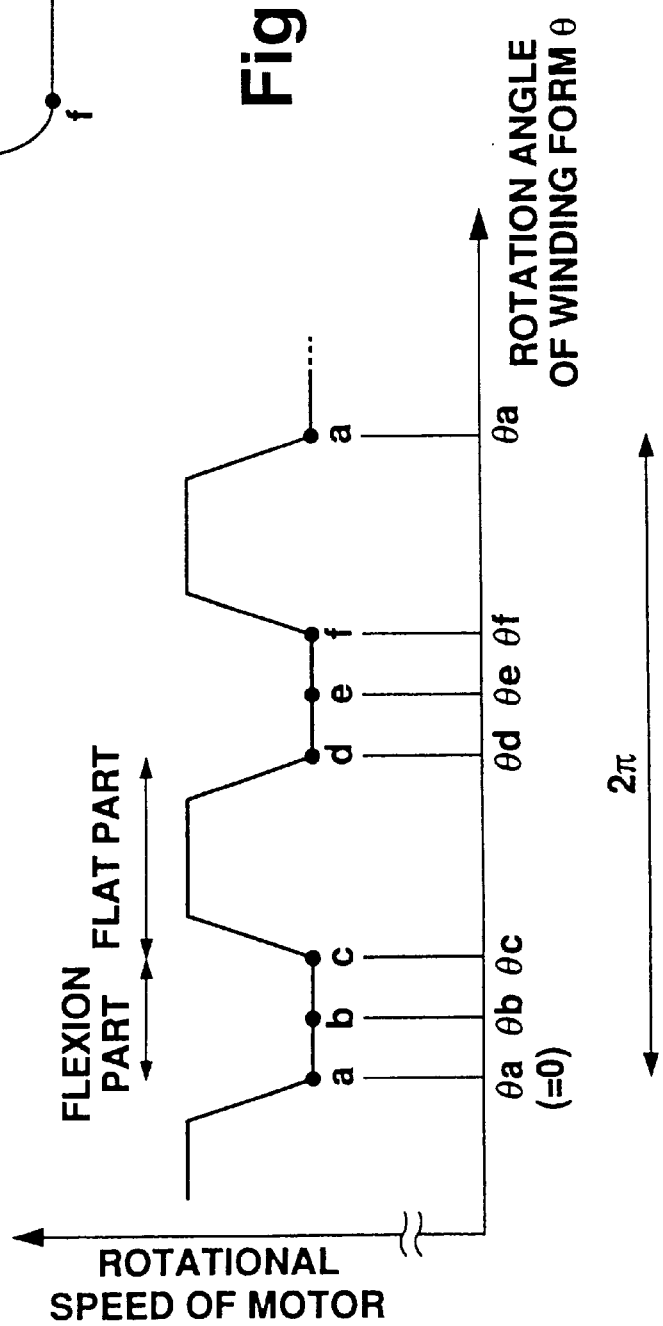

Particularly in this embodiment, a rotational speed of the winding-form motor 29 is controlled according to a rotation angle of the winding form 25 as shown in FIG. 9. A rotation angle of winding form θ of the abscissa represents a rotation angle of the winding form 25. The angle θ is zero when the winding form 25 is in a state as shown in right portion of FIG. 9 (and as shown in FIG. 2). The angle increases with clockwise rotation of the winding form 25, and returns to zero again when the winding form 25 rotates one turn.

When the rotation angle of the winding form is θa (=0), the leading edge of the rectangular wire 9 is tangent to the position (a) of the winding form 25. The leading edge of the rectangular wire 9 refers, as defined above, to that portion of the wire about to be wound on the winding form 25. Similarly, when the leading edge is tangent to the position (b), a rotation angle of winding form is θb. When the leading edge reaches position (c), the rotation angle of winding form is θc, and so forth. From those mentioned above, the rectangular wire 9 is wound on the flexion portion of the winding form 25 when the rotation angle is within the ranges θa≦θ≦θc or θd≦θ≦θf and wound on the flat portion of the winding form 25 when the rotation angle is within the ranges θc<θ<θd or θf<θ<θa.

In this embodiment, the rotational speed of the motor is decreased when the rotation angle is within the range θa≦θ≦θc or θd≦θ≦θf shown in FIG. 9 to ensure forming at the flexion portion. The rotational speed of the motor is increased when the rotation angle is within the range θc<θ<θd or θf<θ<θa. During winding to the flat portion, coil forming can more reliably be performed than compared when winding to the flexion portion, even though the motor increases speed. Rotational speed is controlled by controlling motor torque.

Such motor control allows motor rotation speed to increase while maintaining reliable coil forming. This enables coil manufacturing speed and efficiency to increase.

Figure 10B:
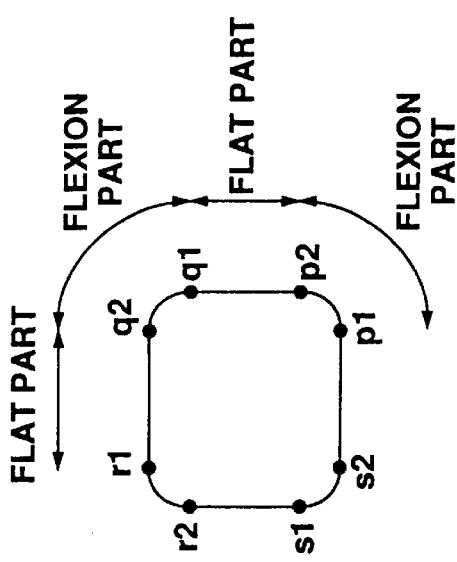
FIG. 10 shows the second example of the control of a winding-form motor.
Figure 10A:
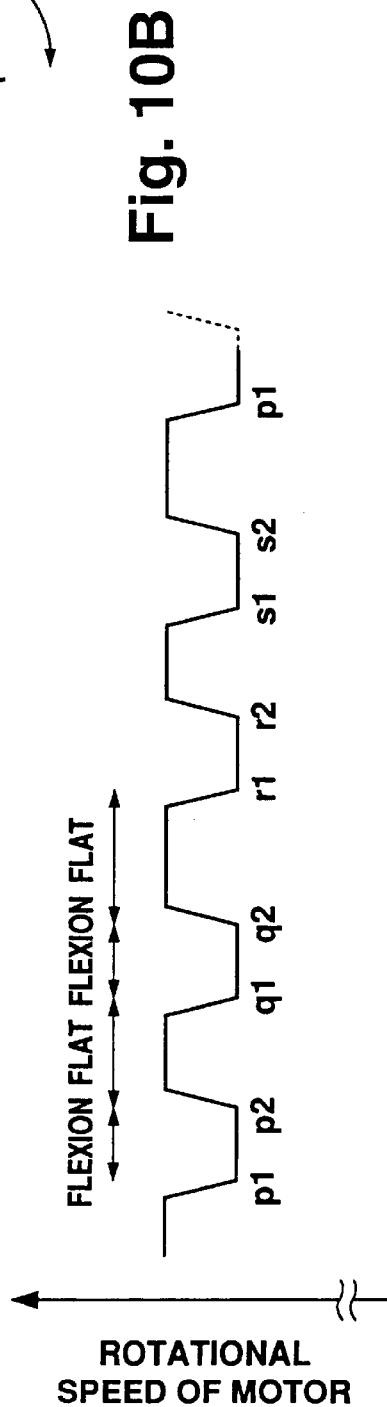

FIG. 10 shows preferred control of the winding-form motor using a winding form having different cross-sectional shape from one depicted in FIG. 1. The winding form of this example has 4 flat portions and 4 flexion portions in circumference. The motor increases and decreases speeds 4 times respectively according to the shape of the winding form during one turn of the winding form.

CONTROL OF ROTATIONAL RESISTANCE GENERATOR

When the circular material wire 3 is pressed through the rectangular forming rollers 7, raw material wire stretches and its cross-sectional area decreases. The rotational speed of the winding form 25 is therefore different from that of the coil reel 1. Therefore, the rotational resistance generator 5 produces force of rotational resistance (torque: Tr) in order to provide a proper level of back tension to the circular wire 3 with consideration given to a difference of rotational speeds between the winding form 25 and the coil reel 1.

In this embodiment, the rotational speed of the winding-form motor 29 is controlled according to a rotation angle of the winding form 25, as explained above. A feed speed of the circular material wire 3 varies with a change in the rotational speed. The rotational resistance generator 5 changes the force of rotational resistance according to variation in the feed speed in such a manner that the force of rotational resistance is increased when the motor rotational speed is relatively high, and decreased when motor rotational speed is low. The back tension provided to the circular material wire 3 locating between the coil reel 1 and the rectangular forming rollers 7 is always maintained in a proper magnitude by controlling the resistance force in conjunction with motor control. Consequently, occurrence of sag or slack in the circular material wire 3 can be preferably prevented.

CONTROL OF A ROLLER PRESSING FORCE GENERATOR

The roller pressing force generator 33 prevents the creation of clearances between the rectangular wire 9 and the winding form 25 (springback) by pressing the rectangular wire 9 to the winding form 25 through the use of the press roller 31. The rectangular wire 9 is formed in a plurality of layers in this embodiment. The press roller 31 also prevents clearance from being created between each of the layers. The roller pressing force is controlled as shown in FIG. 11.

Figure 11B:
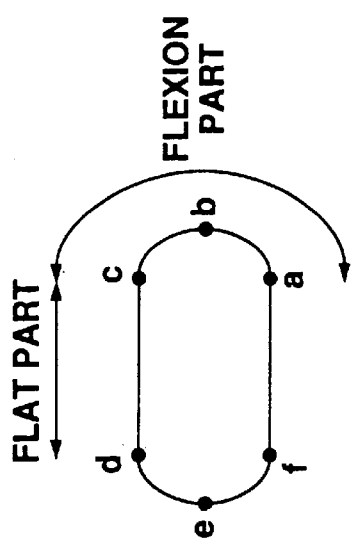
FIG. 11 shows control of a roller pressing force generator.
Figure 11A:
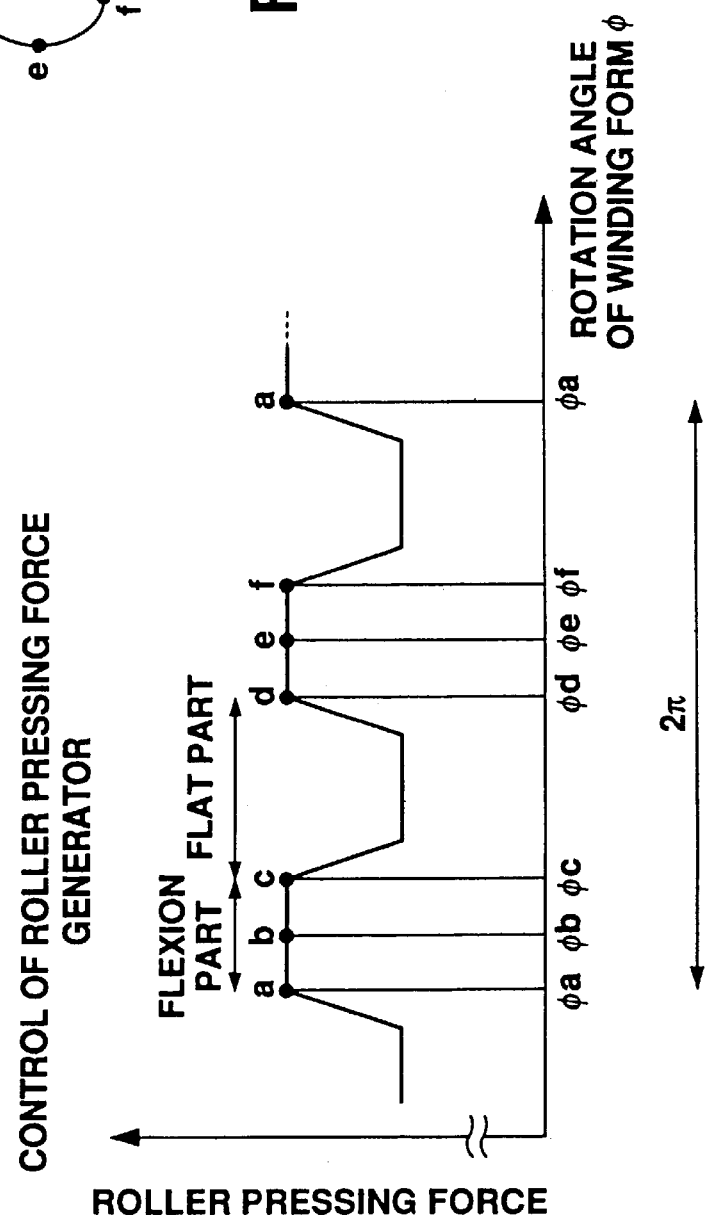

In FIG. 11, an abscissa represents a rotation angle of winding form φ. Criteria of the angle φ differ from the angle θ described in FIG. 9. The press roller 31 is tangent to the rectangular wire 9 at the position (a) of the winding form 25 when the rotation angle of winding form is φa, tangent to the rectangular wire 9 at the position (b) of the winding form 25 when the rotation angle of winding form is φb, and so forth.

In this embodiment, roller pressing force is decreased when the rotation angle is within the range φc<φ<φd or φf<φ<φa as illustrated in FIG. 11. This configuration produces sufficient to prevent springback from occurring when the press roller 31 locates on the flat portion of the winding form 25. Roller pressing force is increased when the rotation angle is within the range φa ≦φ≦φc or φd≦φ≦φf. This allows the rectangular wire 9 to be reliably formed when the press roller 31 is located on the flexion portion of the winding form 25.

Control of the roller pressing force as described above allows the required pressing force to operate in an efficient manner and the rectangular wire to be reliably wound on the winding form. Thereby it becomes possible to improve coil quality. It may also be preferable to modify the control as in the case described with FIG. 10, according to the cross-sectional shape of the winding form and as occasion demands.

CONTROL OF BENDING TOOL PRESSING FORCE

The generator of bending tool pressing force 37 prevents clearance from being created between the rectangular wire 9 by pressing that portion of the rectangular wire 9 about to be wound to an adjacent portion of that has already been wound through the use of the bending tool 35. The bending tool pressing force is controlled as depicted in FIG. 12.

In FIG. 12, an abscissa represents a rotation angle of winding form ψ. Criteria of the angle ψ also differ from the angle θ described in FIG. 9. The bending tool 36 is tangent to the rectangular wire 9 at the position (a) of the winding form 25 when the rotation angle of winding form is ψa, and tangent to the rectangular wire 9 at the position (b) of the winding form 25 when the rotation angle of winding form is ψb, and so forth.

In this embodiment, the bending tool pressing force is decreased when the rotation angle is within the range ψc<ψ<ψd or ψf<ψ<ψa as illustrated in FIG. 12, and increased when the rotation angle is within the range ψa≦ψ≦ψc or ψd≦ψ≦ψf. This allows the rectangular wire 9 to be reliably arranged when the bending tool 35 locates on the flexion portion of the winding form 25.

Control of the bending tool pressing force as described above allows the required pressing force to operate in an efficient manner and the rectangular wire to be reliably wound on the winding form, making it possible to improve coil quality. It is preferable to modify the control, as was the case for the configuration described in FIG. 10, according to the cross-sectional shape of the winding form and as occasion demands.

According to this first preferred embodiment of the present invention, a raw material wire, required for manufacturing a coil, may be a resin-coating conductor with a circular cross section (the circular material wire 3), as is commonly conventionally used for manufacturing a circular-wire coil. Such conductor can be purchased and manufactured at a relatively low cost. The circular material wire 3 is pulled out of the bobbin, processed with a roller dice, and made into the rectangular wire 9, which is continuously and directly sent to the winding form 25 to be formed into the rectangular-wire coil 39. Rectangular wire formation and form winding form are carried out in a sequence of contiguous process. As torsion set caused by taking up the rectangular wire to the bobbin is therefore prevented, an apparatus or a process for removing the torsion set becomes unnecessary. Consequently, this may contribute to improved quality. In addition, the torsion set is removed spontaneously in the process to form the rectangular wire when the material wire 3 includes such torsion set.

Thus, the invention of the present embodiment enables manufacture of a rectangular-wire coil using inexpensive raw material wire, through a simple and low-cost apparatus, and in a short time. As a result, it becomes possible to improve quality and productivity, and to reduce required production facility space and labor. Consequently, it becomes possible to provide a high-performance motor at a low cost.

In this first embodiment, the rectangular wire is wound on the winding form with reliability, and the rectangular-wire coil is formed with precision by controlling each component such as the winding-form motor 29 in the manner explained above. Furthermore, it becomes possible to pursue additional improvements in quality and productivity.

EMBODIMENT 2

In the first embodiment explained up to this point, the rate of elongation at forming the rectangular wire from the material wire is fixed and only one type of rectangular wire with a uniform cross-sectional shape is formed. It is then required to construct new equipment according to other specifications to manufacturing coils differing in rectangular wire cross-sectional shapes.

In the apparatus according to a second embodiment of the present invention, contrary to the first embodiment, an adjustment mechanism for changing the rate of elongation when forming the rectangular wire is included. The adjustment mechanism allows the same equipment to manufacture coils using differing in rectangular wire cross-sectional shapes. Control of the rate of elongation is implemented by adjusting clearance width between the rectangular forming rollers and tension acting on the rectangular wire, as will be explained below.

Figures 13A, 13B, 13C:
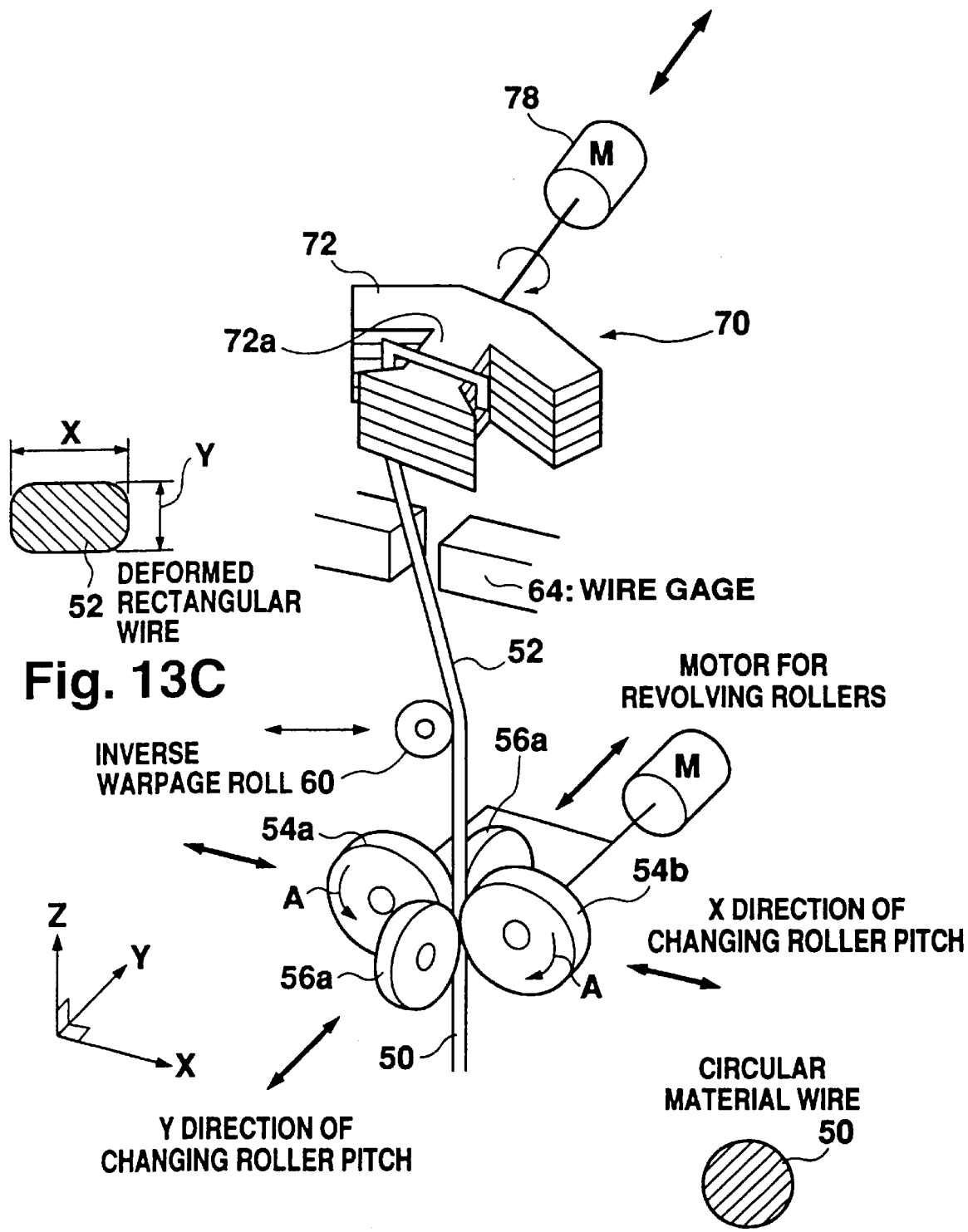
FIG. 13 shows construction of the second embodiment of the apparatus for manufacturing a rectangular-wire coil.
Figure 14A:
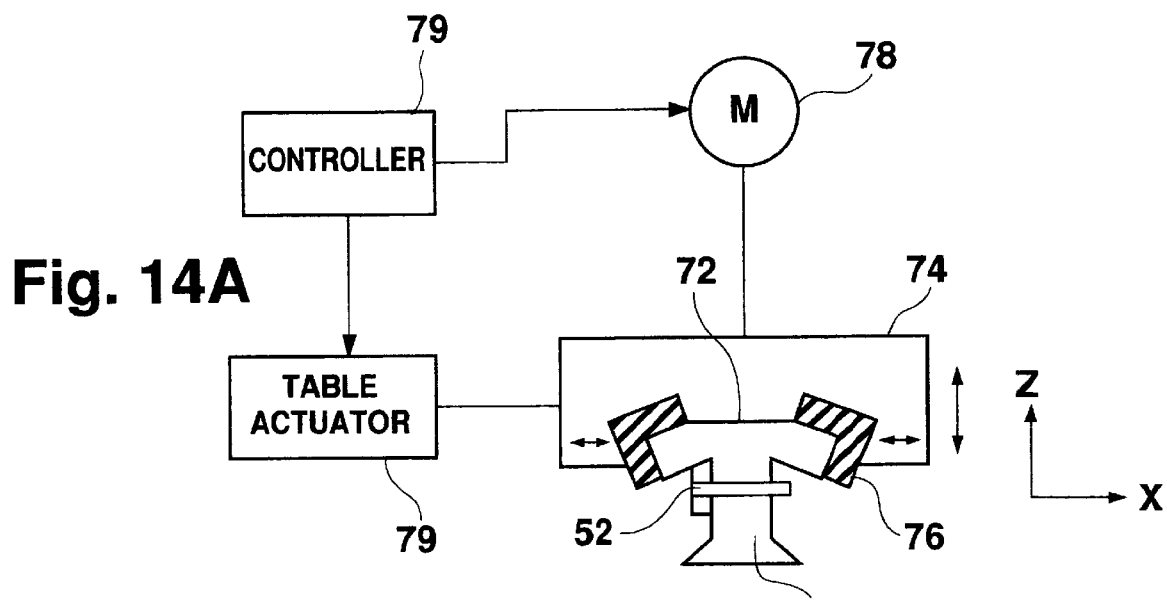
FIG. 14A is a plan view and FIG. 14B is a front elevation of the FIG. 13 device.
Figure 14B:
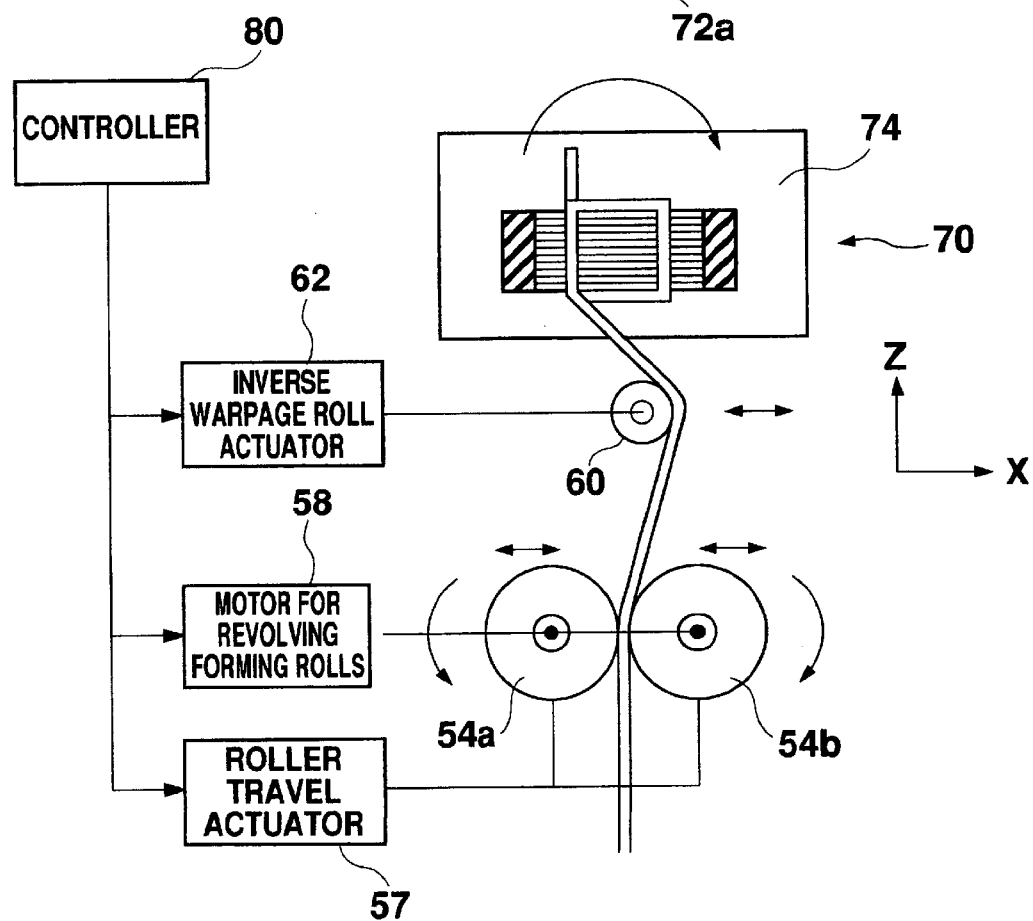

FIG. 13, FIG. 14A, and FIG. 14B show construction of an apparatus for manufacturing a coil according to the second embodiment of the present invention. In this embodiment, the X, Y, and Z axes are defined as illustrated in FIG. 13. The X direction corresponds to the sideward direction of the first embodiment, the Y direction to up and down, and Z direction to feed direction. FIG. 14A is a plan view from Z direction and FIG. 14B is a front view from Y direction of the apparatus of FIG. 13.

Rectangular forming rollers for pressing a circular material wire 50 in order to form rectangular wire 52 operate as in the first embodiment. A pair of rollers 54a and 54b for deformation in X direction and a pair of rollers 56a and 56b for deformation in Y direction are installed so as to be orthogonal to each other.

And stator block 72 is used as a winding form for coil forming in a coil forming device 70 of the second embodiment. The stator block 72 is laminated with electromagnetic steel and formed in the shape in pieces made by dividing a motor stator into a plurality of pieces. An interpole winding coil is mounted on the stator block 72 upon completion of coil forming in this structure. The stator is completed by placing the plurality of blocks in a circle and connecting them. Productivity may be improved by applying the stator block 72 as the winding form.

A chuck 76, which is attached on a table 74 and capable of opening and closing action, holds the stator block 72. The table 74 is turned through a motor for revolving stator 78 and also reciprocated in the Y direction according to a winding pitch of the rectangular wire 52 by a table actuator 79 of a feed mechanism. By the rotation and reciprocating movement in the Y direction of the stator block 72, the rectangular wire 52 is wound on polar teeth 72a of the stator block 72, and a coil is formed.

An inverse warpage roll 60 is equipped between the coil forming device 70 and forming rollers 54 and 56. The inverse warpage roll 60 imparts warpage, opposite in direction to the winding shape, to the rectangular wire 52 before winding. This inverse warpage prevents the rectangular wire 52 from bending which often causes the rectangular wire 52 to part from the stator block 72 during subsequent processes. As a result, the rectangular wire 52 is more closely wound on the stator block 72. An inverse warpage roll actuator 62 reciprocates the inverse warpage roll 60 in the X direction according to winding of the rectangular wire 52.

The second embodiment is characterized as follows. The rectangular forming rollers 54a and 54b for X-direction deformation are equipped with a roller travel actuator 57 which moves these rollers in the X direction in order to locate them in the desired position. The rectangular forming rollers 56a and 56b for Y-direction deformation are equipped with a similar actuator (not illustrated). These actuators adjust clearance between the rollers.

Furthermore, the rectangular forming rollers 54a and 54b for X-direction deformation are connected to a motor for revolving forming roller 58. Tension acting on the portion of the rectangular wire 52 between the forming rollers and the stator block is determined according to the output torque generated by both the motor for revolving forming roller 58 and the motor for revolving stator 78.

Immediately after deformation by the rectangular forming rollers, the rectangular wire 52 has the same cross-sectional shape as the clearance between rollers. The rectangular wire is stretched after passing through the forming rollers by the action of the tension. Therefore, the final (X and Y) dimensions of the rectangular wire at being taken up to the stator block 72 is smaller than the dimensions of that at passing through the rollers. This means that the cross-sectional shape of the rectangular wire 52 may be varied by controlling the tension acting on the rectangular wire 52.

The motor for revolving forming roller 58 provides turning force (torque) to the two forming rollers 54a and 54b via a transfer belt. Turning force, such as by sending the rectangular wire 52 in the reverse direction (return direction) is transferred to both of the rollers. Although the turning force generated by the motor 58 acts as resistance force to pull back the rectangular wire 52, the turning force does not exceed the force to pull the rectangular wire 52 in the feed direction. Consequently, the rollers rotate in the feed direction of the rectangular wire 52 as illustrated in the figure.

In addition, an optical wire gage 64 is equipped just before the coil forming device 70 as illustrated in FIG. 13. The wire gage 64 measures the final (X and Y) dimensions of the rectangular wire 52 immediately before winding, and then transmits measurement results to a controller 80.

As shown in FIG. 14, the controller 80 controls the coil forming device on the whole and, more specifically, controls the roller travel actuator 57, the motor for revolving forming roller 58, the inverse warpage roll actuator 62, the motor for revolving stator 78, and the table actuator 79. The controller 80 manufactures a coil wound by the rectangular wire having target shape in cross section through controlling, in particular: (i) clearance width between forming rollers and (ii) tension acting on the rectangular wire. Control of tension is, as stated already, implemented by controlling the torque generated by the motors.

Figure 15:
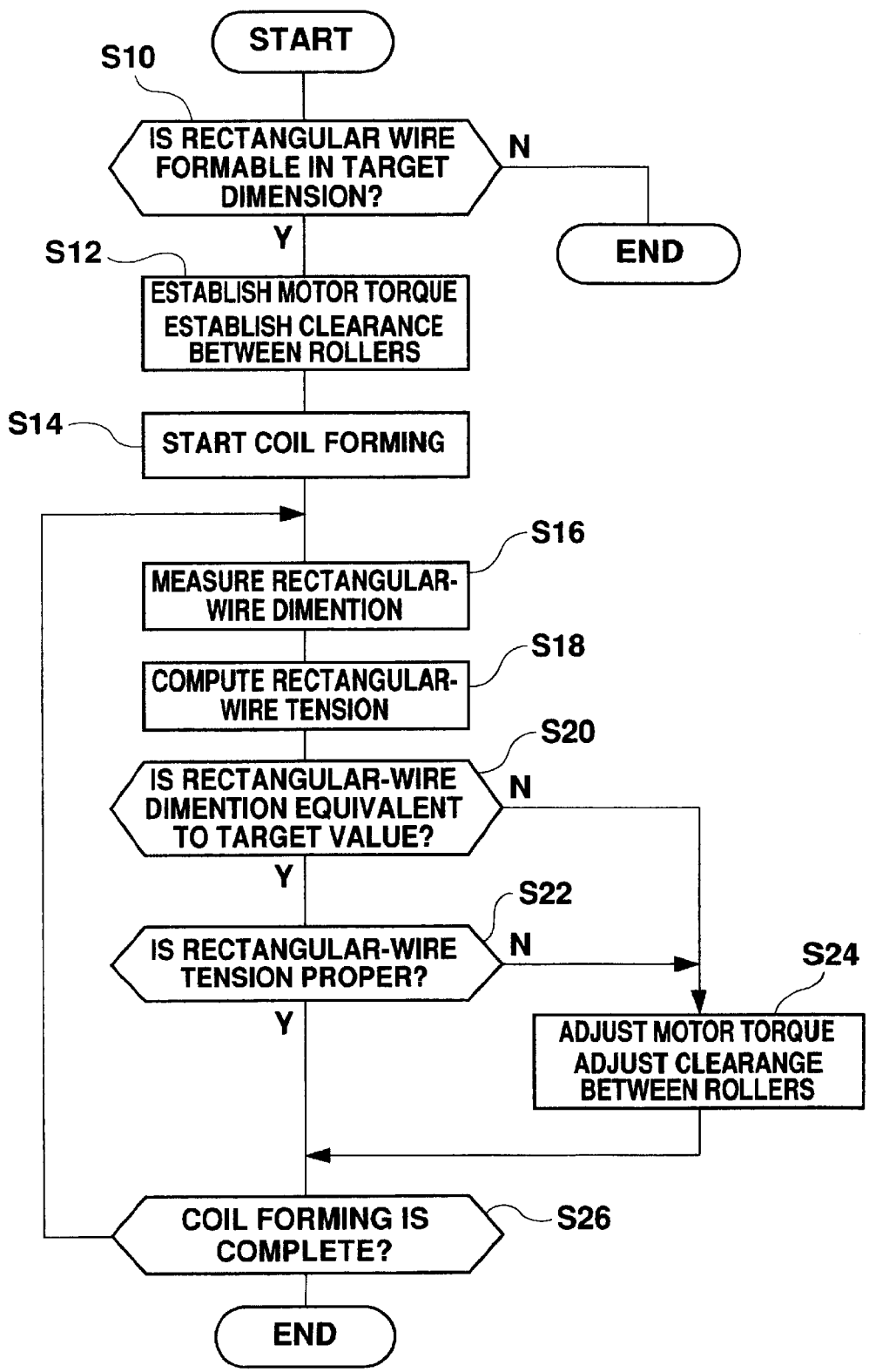
FIG. 15 is a flow chart showing the operation of the apparatus of the second embodiment.

FIG. 15 is a flow chart of a control process of the controller 80 and shows operations of the manufacturing apparatus of the second embodiment. First, the controller 80 determines whether rectangular wire of the target dimensions is formable, after the target dimensions of the rectangular wire are established (S10). The controller 80 makes this determination on the basis of stored data in which diameters of the circular material wire are linked with dimensions of formable rectangular wire.

Figure 16A:
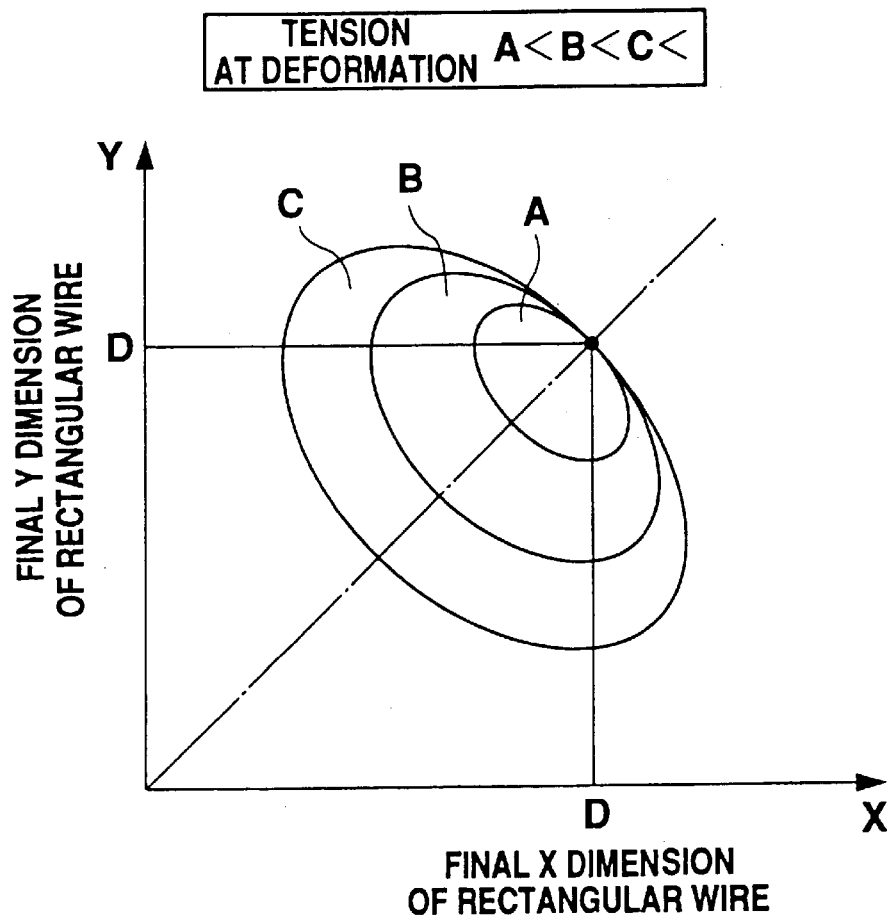
FIG. 16 shows a range of formable cross-sectional shapes of rectangular wire.
Figure 16B:
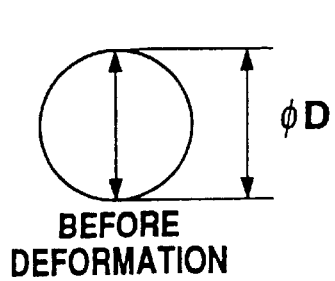
Figure 16C:
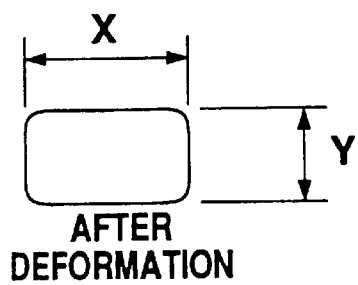

Example formable dimensions for rectangular wire are shown in FIG. 16. The abscissa represents the final dimension in the X direction, while the ordinate represents that in Y direction. These are the dimensions of the rectangular wire at being wound on the stator block after passing through the rollers. A circular material wire of D in diameter may be manufactured into a coil wound by the rectangular having dimensions within the range indicated in the figure. Tension at deformation increases in the order of a sphere A, B, and C.

Processing is terminated if at S10 it is determined that wire of the target dimensions is not formable. When forming is determined to be possible at S10 motor torque and clearance width between rollers are next established (S12). The controller 80 executes processing at this point with reference to the map shown in FIG. 17.

In FIG. 17, the abscissa represents clearance widths between the forming rollers of the X direction, while the ordinate represents final X dimensions of the rectangular wire. The graph shows the relationship between final the Y dimensions and clearance widths between the rollers of the Y direction. The width of the rectangular wire immediately after passing through the forming rollers is equivalent to a clearance width between rollers as indicated by dotted a dashed line. However, as the rectangular wire is stretched just after passing through the rollers, the final dimensions of the rectangular wire are smaller than the clearance width between the rollers. The final dimensions become smaller as tension increases. The final dimensions of the rectangular wire are determined by the tension. That is, the shape of the rectangular wire varies with control of tension.

The tension of the rectangular wire must be controlled within the ranges indicated by the diagonally shaded areas in FIG. 17. A lower limit of the proper tension is established at a correct value such that improper sag does not occur in the portion of the rectangular wire between the forming rollers and the winding form and favorable finishing may be achieved. An upper limit of that is established at a value such that coil wire, and especially insulating coating (enamel etc.), is not damaged. FIG. 18 shows a relationship between deformation amounts of a raw material wire and applicable tension. The deformation amount is a difference of shapes between the shape of the circular material wire and the shape of the rectangular wire and defined as deformation amount= $\Delta X+\Delta Y$ ($\Delta X$ is a half amount of the X dimension and $\Delta Y$ is that of the Y dimension), as illustrated. The upper limit of tension, able to avoid damaging an insulating coating becomes lower as deformation amount increases. The proper tension area of FIG. 17 is established so as not to exceed the upper limit of tension shown in FIG. 18.

In FIG. 15, the controller 80 determines: (1) the clearance width between the rectangular forming rollers 54a and 54b of X direction, (2) a clearance width between the rectangular forming rollers 56a and 56b of Y direction, and (3) tension of the rectangular wire 52 with reference to the map of FIG. 17, in order to achieve target dimensions (final dimensions) of the rectangular wire at S12. For example, a constant tension line (line connecting the dots corresponding to established same tension: the established tension is set in the proximity of the medium value of proper tension) indicated by dotted line (m) in the figure is used for a variety of settings. For a point corresponding to the final X and Y dimensions of a target on dotted line (m), the coordinates of an abscissa on the acquired point express proper clearance width between the rollers.

The controller 80 starts coil forming according to the settings of S12 (S14). The controller 80 controls the roller travel actuator (in the X and Y directions) to arrange the clearance width between the rollers as established. The controller 80 determines respective output torque to be generated by the motor for revolving stator 78 and by the motor for revolving rollers 57 on the basis of the tension determined at S12, and then controls the motors. The table actuator 79 reciprocates according to rotation of the motor for revolving the stator 78.

The rectangular forming rollers 54 and 56 press the circular material wire 50 to form the rectangular wire 52 as described above and the rectangular wire 52 with adequate warpage reaches the stator block 72. At this point, the rectangular wire is stretched with tension of a described magnitude so that it obtains the target cross-sectional shape and dimensions. This rectangular wire is taken up to the stator block 72 to form a rectangular-wire coil.

After forming, the wire gage 64 carries out actual measurement of dimensions of the rectangular wire and inputs the measured data to the controller 80 (S16). The controller 80 detects respective output torque of each of the motor for revolving stator 78 and the motor to rotate rollers 57 on the basis of the detected value of current actually flowing in both of the motors and computes a value of actual tension acting on the rectangular wire 52 using the output torque (S18).

The controller 80 determines conformance to target dimensions in regard to measured value of the dimensions (S20). When the measured value differs from the target value, the controller 80 adjusts clearance widths between the rollers and motor torque in order that the measured dimensions of the rectangular wire should approach the target dimensions (S24). As a matter of course, adjustment of motor torque is executed to change the tension acting on the rectangular wire. When, for example, a cross-sectional shape is smaller than a target one, the controller 80 adjusts clearance widths between rollers as needed, in addition to reducing tension in order to increase a width of the rectangular wire. The table in FIG. 17 is also referenced for a setting change at this point as occasion demands.

When the target dimensions are achieved at S20, the controller 80 decides whether the tension obtained at S18 is proper (S22). Whether tension is within the range indicated as the diagonally shaded areas in FIG. 17, or whether tension exceeds the upper limit tension of FIG. 18, is judged here. When the tension is judged not proper, the controller 80 continues on to S22 and adjusts clearance widths of the rollers and motor torque (S24). As can be seen from FIG. 17, the rectangular wire may be formed in the same dimensions as it is now by adjusting clearance width between rollers though tension is changed.

When tension is determined to be proper tension, or after it has been adjusted at S24, the controller 80 judges whether or not coil forming is completed (S26). The coil forming is determined to be not completed until a predetermined number of turns of the rectangular wire 52 is wound on the stator block 72, i.e. the stator block rotates a predetermined number of times. In this case, coil forming remains in production with returning to S16. Processing is terminated when coil forming is determined as completed at S26.

Up to this point, an apparatus for manufacturing a coil of the second embodiment has been explained. The circular material wire used for the apparatus of FIG. 13 is, for example, 2.7 mm in diameter and dimensions of the rectangular wire formed from the circular material wire is, for example, approximately 3.2 mm×1.8 mm.

In this embodiment, a cross-sectional shape of the rectangular wire becomes variable because clearance widths between the rollers and tension of the rectangle can be controlled. Thus, it is unnecessary to prepare new equipment each time the cross-sectional shape of the rectangular wire is changed. As a result, production facilities may be reduced. In addition, as a single type of material wire is used to produce one or more types of coils, the economy of mass production results in reduction of material cost. Thus, this invention may contribute to improvement of productivity for manufacturing rectangular-wire coils.

Furthermore, according to this second embodiment, monitoring and adjusting the clearance widths between the rollers and the tension of the rectangular wire during coil forming lead to an improvement in precision of a cross-sectional shape of the rectangular wire.

Although the above description of apparatus for manufacturing a coil of the second embodiment does not include the bending tool and press rollers provided in the first embodiment, these components may, of course, also be added in the second embodiment. In addition, preferred control of each component may be applied to the apparatus for manufacturing a coil of the second embodiment.

Embodiment 3

Clearance between coil wire decreases when rectangular wire is employed. However, clearance does, to some degree, still appear. Any clearance between coil wire depresses the overall thermal conductivity of a coil because the thermal conductivity of air is low. From the viewpoint of motor performance, it may be desired to increase thermal conductivity by eliminating clearance by blocking out air. To accomplish this, treating a completed coil with resin molding treatment may be considered. However, this will lead to increased manufacturing costs because of the additional expensive equipment required.

Allowing for the circumstances mentioned above, a third embodiment of the present invention enables improvement of thermal conductivity of the rectangular-wire coil, as described in the following.

Figure 19:
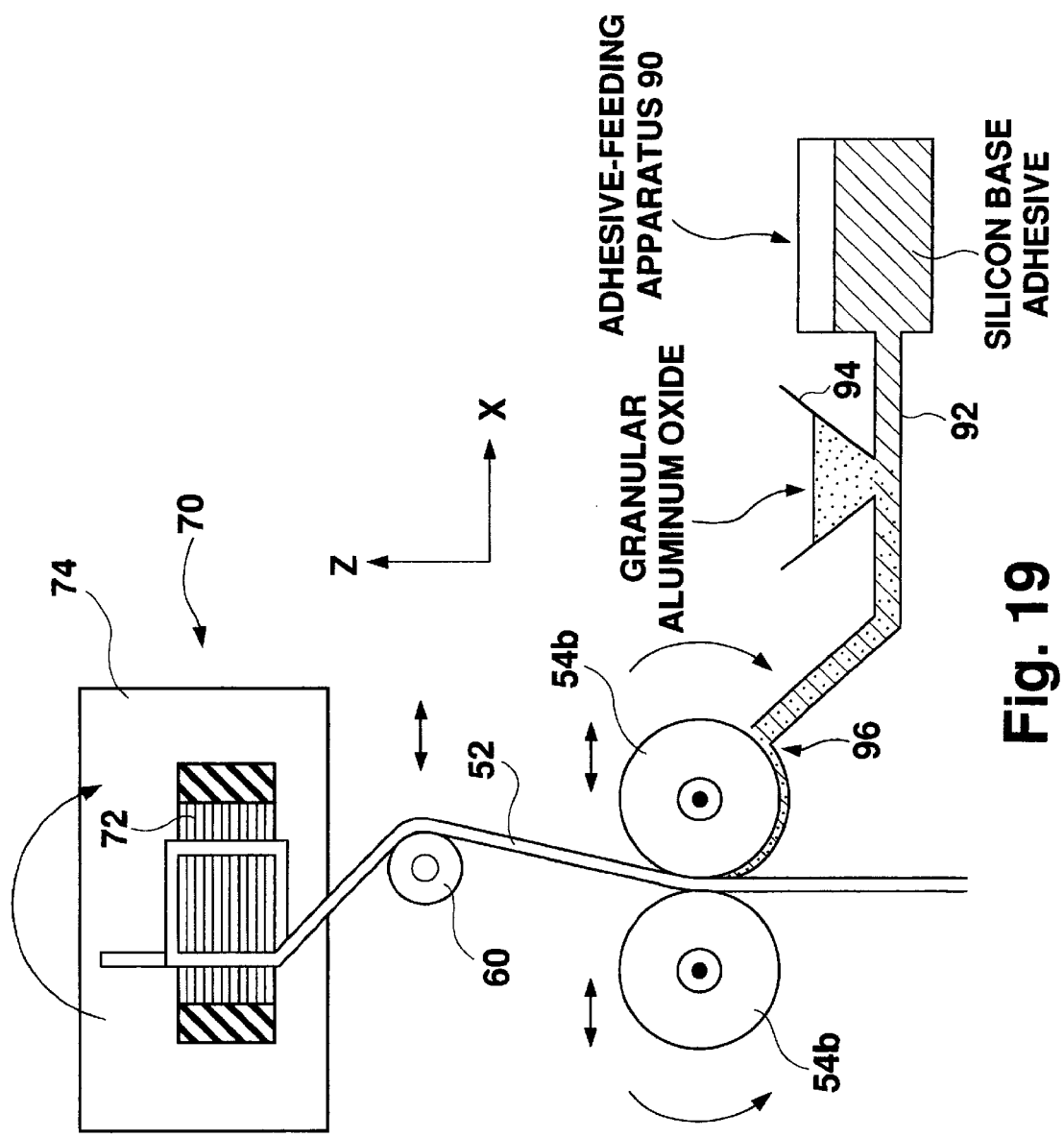
FIG. 19 shows construction of the third embodiment of the apparatus for manufacturing a rectangular-wire coil.

FIG. 19 shows the configuration of a coil manufacturing apparatus according to the third embodiment of the present invention. This apparatus, using a stator block 72 as the winding form, is, in principle, very similar to that of the second embodiment. In FIG. 19, elements equivalent to elements of the second embodiment in FIGS. 13 and 14 are given the same labels and their explanation will not be repeated.

The third embodiment of the present invention is characterized as follows. An insulating material, to which silicon base adhesive is applied, is deposited on the rectangular wire at the part of the rectangular forming rollers. The adhesive is stored in an adhesive-feeding apparatus 90 and flows out to a feed pipe 92. A granular aluminum oxide feeder 94 equipped at some midpoint in the feed pipe 92 pours aluminum oxide in a granular state into the pipe. The silicon base adhesive mixed with the aluminum oxide is supplied to a circumference surface of the rectangular forming rollers from an outlet 96 of the feed pipe 92. The adhesive is supplied to the rollers 54a, 54b, 56a, and 56b in the X and Y directions in a similar manner, and is then carried with rotation of the rollers, though this is not illustrated in FIG. 19. The adhesive reaches raw material wire in a portion of clearance between rollers, that is, the adhesive is deposited where the circular material wire is deformed into the rectangular wire. The rectangular wire 52 is thus forwarded the roller part in an adhesive covered state.

The rectangular wire 52 covered with adhesive is then wound around the stator block 72 via the inverse warpage roll 60. At this time, the adhesive inserted into clearances between the rectangular wire 52 adjacent to each other. Therefore, a silicon base adhesive, mixed with granular aluminum oxide of an insulating material of which thermal conductivity is high, bridges the clearance. As a result, thermal conductivity of a coil becomes high and performance of a motor equipped with the coil may be improved.

As described above, it becomes possible to bridge the clearance between rectangular wire of a coil by applying insulation adhering means. Improved coil thermal conductivity is achieved with simple facilities.

In particular, an insulating material (an adhesive) is supplied through the use of the rectangular forming rollers in the third embodiment. The equipment is therefore simple, while heating value incident to deformation is reduced because an insulating material is supplied where the circular material wire is deformed into the rectangular wire. This prevents an insulating coating (enamel or the like) covered around the wire from shortening its life and coil longevity is increased. Utilization of the rectangular forming rollers thus has advantages of manufacturing a coil with achieving high thermal conductivity at a low cost and increasing the longevity of a coil.

A modification of the third embodiment may be made as follows. Although silicon base adhesive mixed with aluminum oxygen is used as an insulating material in the aforesaid apparatus, another type of insulating materials may be capable of being applied within the scope of this invention.

The insulation adhering means may be equipped between the forming rollers and the winding form (between rectangular forming means and coil forming means) while it is attached on the portion of the forming rollers in above mentioned apparatus. In this case, a roller for depositing an insulating material is added to the apparatus of FIG. 19.

Moreover, the insulating material may be deposited on the rectangular wire through the use of other elements than the roller, or may be supplied directly to the rectangular wire from a pipe.

Furthermore, although the insulation adhering means is added to the apparatus of the second embodiment, it is obvious that it may also be provided to that of the first embodiment.

And as a mater of course, this invention may be capable of being applied to manufacturing coils used other than in a motor.

What is claimed is:

1. An apparatus for manufacturing a rectangular-wire coil, comprising:

feeding means for supplying material wire;

rectangular forming means with rectangular forming rollers for deforming the material wire whereby the material wire provided through the feeding means is deformed to form wire with a rectangular cross section;

coil forming means whereby the rectangular wire is wound on a winding form to form a rectangular-wire coil and the coil forming means includes a winding-form motor for rotating said winding form, wherein forming rectangular wire and winding on the winding form are performed in a sequence of continuous processes which include rotating the winding form using a turning force generated by the winding-form motor, the rectangular wire pulled so as to provide the tension required for extracting the material wire from the rectangular forming rollers and winding on the winding form; and winding-form motor control means for controlling the winding-form motor in order to vary a rotational speed of the motor according to a rotation angle of the winding form.

2. The apparatus for manufacturing a rectangular-wire coil according to claim 1, wherein said winding-form motor control means reduces speed of said winding-form motor when the rectangular wire is being wound on a flexion portion of said winding form, and increases speed of said winding-form motor when the rectangular wire is being wound on a flat portion of said winding form.

3. The apparatus for manufacturing a rectangular-wire coil according to claim 1, wherein said feeding means includes a rotatable material wire reel on which said material wire is wound and back tension producing means to prevent sag by imparting back tension to a section of the material wire between said material wire reel and said rectangular forming rollers, and wherein said back tension producing means imparts back tension, related to a difference between a rotational speed of said winding form and that of said material wire reel, and changes said back tension according to a rotational speed of said winding-form motor in conjunction with said winding-form motor control means.

4. The apparatus for manufacturing a rectangular-wire coil according to claim 1, wherein said coil forming means includes a press roller for pressing the rectangular wire to closely contact with said winding form, and means for controlling roller pressing force by changing the roller pressing force generated by said press roller according to a rotation angle of said winding form, and wherein said means for controlling roller pressing force decreases said roller pressing force when said press roller is located on a flat portion of said winding form, and increases said roller pressing force when said press roller is located on a flexion portion of said winding form.

5. The apparatus for manufacturing a rectangular-wire coil according to claim 1, wherein said coil forming means includes a bending tool for pressing a portion of said rectangular wire which is about to be wound on said winding form so that it closely contacts with another portion which has already been wound, and means for controlling bending tool pressing force exerted by said bending tool according to a rotation angle of said winding form, and wherein said means for controlling bending tool pressing force decreases said bending tool pressing force when said bending tool is located on a flat portion of said winding form, and increases said bending tool pressing force when said bending tool is located on the flexion portion of said winding form.

6. The apparatus for manufacturing a rectangular wire-coil according to claim 1, comprising:

rectangular forming control means for controlling said rectangular forming means according to target forming dimensions of the rectangular wire, wherein
coils of differing cross-sectional shapes can be manufactured.

7. The apparatus for manufacturing a rectangular-wire coil according to claim 6, wherein said rectangular forming control means adjusts cross-sectional shapes of said rectangular wire by controlling tension of said rectangular wire.

8. The apparatus for manufacturing a rectangular-wire coil according to claim 1, wherein insulation adhering means for depositing an insulating material on said rectangular wire is provided to said rectangular forming means or provided between said rectangular forming means and said coil forming means.

9. An apparatus for manufacturing a rectangular-wire coil, comprising:

rectangular forming rollers for deforming a material wire pulled out of a material supplying source in order to form wire with a rectangular cross section;

a winding form to which the rectangular wire formed through said rectangular forming rollers is supplied;

a winding-form motor for rotating said winding form to form a coil by winding the rectangular wire on said winding form; and winding-form motor control means for controlling the winding-form motor in order to vary a rotational speed of the motor according to a rotation angle of the winding form.

* * * * *